US012473946B2

(12) United States Patent
Fukuda et al.

(10) Patent No.: US 12,473,946 B2
(45) Date of Patent: Nov. 18, 2025

(54) SLIDING COMPONENTS

(71) Applicant: EAGLE INDUSTRY CO., LTD., Tokyo (JP)

(72) Inventors: Shogo Fukuda, Tokyo (JP); Tadatsugu Imura, Tokyo (JP); Iwa Ou, Tokyo (JP); Hiroshi Suzuki, Tokyo (JP); Kenta Uchida, Tokyo (JP); Hiroki Aizawa, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 51 days.

(21) Appl. No.: 18/575,663

(22) PCT Filed: Jun. 28, 2022

(86) PCT No.: PCT/JP2022/025794
§ 371 (c)(1),
(2) Date: Dec. 29, 2023

(87) PCT Pub. No.: WO2023/286590
PCT Pub. Date: Jan. 19, 2023

(65) Prior Publication Data

US 2024/0309910 A1 Sep. 19, 2024

(30) Foreign Application Priority Data

Jul. 13, 2021 (JP) ................................ 2021-115873

(51) Int. Cl.
*F16C 17/02* (2006.01)

(52) U.S. Cl.
CPC ................................ *F16C 17/026* (2013.01)

(58) Field of Classification Search
CPC ...... F16J 15/3416; F16J 15/3412; F16J 15/34; F16C 17/026

(Continued)

(56) References Cited

U.S. PATENT DOCUMENTS 3,085,808 A * 4/1963 Williams ............ F16J 15/3416 277/408
3,232,680 A * 2/1966 Clark ................ F16C 33/1075 384/110

(Continued)

FOREIGN PATENT DOCUMENTS

CN 2534429 2/2003 ............... F16J 15/40
CN 1492152 4/2004 ............ F04D 29/12

(Continued)

OTHER PUBLICATIONS

Definition of groove by Merriam Webster.

(Continued)

*Primary Examiner* — Henry Y Liu
(74) *Attorney, Agent, or Firm* — HAYES SOLOWAY P.C.

(57) ABSTRACT

There are provided sliding components that allow sliding surfaces to smoothly slide against each other regardless of whether a relative rotation direction is a forward rotation or a reverse rotation. The sliding components and include: a pair of sliding surfaces and disposed to face each other at a location where a relative rotation takes place when a rotating machine is driven. The sliding surface is provided with a first dynamic pressure generating groove communicating with a radially outer-side space and extending in one circumferential direction, a second dynamic pressure generating groove extending in the opposed circumferential direction, and a conduit groove communicating with the space. The conduit groove includes an annular groove and a communication groove communicating between the annular groove and the space. The second dynamic pressure generating groove is disposed closer to the space than the annular groove, and communicates with the annular groove.

18 Claims, 17 Drawing Sheets

(58) Field of Classification Search
USPC .......................................................... 384/274
See application file for complete search history.

(56) References Cited

U.S. PATENT DOCUMENTS 3,376,083 A * 4/1968 Muijderman ......... F16C 33/102 384/123
3,410,565 A * 11/1968 Williams ............... F16J 15/342 415/174.3
3,466,052 A * 9/1969 Ludwig .................. F16J 15/406 277/377
3,499,653 A * 3/1970 Gardner ............... F16J 15/3412 277/362
3,527,465 A * 9/1970 Guinard .............. F04C 15/0038 277/400
3,656,227 A * 4/1972 Weinand ............ B29D 99/0053 425/DIG. 47
3,804,424 A * 4/1974 Gardner ............... F16J 15/3412 277/400
4,406,466 A * 9/1983 Geary, Jr. ............ F16J 15/3412 277/400
4,486,026 A * 12/1984 Furumura .............. G11B 19/20 277/366
5,092,612 A * 3/1992 Victor .................. F16J 15/3412 277/400
5,201,531 A * 4/1993 Lai ....................... F16J 15/3412 277/400
5,222,743 A * 6/1993 Goldswain ........... F16J 15/3412 277/400
5,441,283 A * 8/1995 Pecht ................... F16J 15/3412 277/400
5,447,316 A * 9/1995 Matsui ................. F16C 17/045 277/400
5,492,341 A * 2/1996 Pecht ................... F16J 15/3412 384/123
5,498,007 A * 3/1996 Kulkarni .............. F16J 15/3412 277/408
5,501,470 A * 3/1996 Fuse .................... F16J 15/3424 277/400
5,556,111 A * 9/1996 Sedy ..................... F16C 33/741 277/400
5,664,787 A * 9/1997 Fuse .................... F16J 15/3412 277/400
5,702,110 A 12/1997 Sedy
5,895,051 A * 4/1999 Bowers .................... B62D 5/22 180/428
6,152,452 A * 11/2000 Wang ................... F16J 15/3412 277/400
6,189,896 B1 * 2/2001 Dickey ................. F16C 17/045 277/400
6,446,976 B1 * 9/2002 Key ....................... F16J 15/342 277/369
6,817,766 B2 * 11/2004 Gomyo ................... F16C 17/10 384/100
7,044,470 B2 * 5/2006 Zheng .................. F16J 15/3448 277/408
7,258,346 B2 * 8/2007 Tejima ................. F16J 15/3412 277/400
7,510,330 B2 * 3/2009 Obara ................... F16C 33/107 384/119
7,568,839 B2 * 8/2009 Gotoh ................... F16C 17/045 384/123
7,758,051 B2 * 7/2010 Roberts-Haritonov ..................... F16J 15/342 277/408
8,814,433 B2 * 8/2014 Tokunaga ............. F16C 33/741 384/123
9,062,775 B2 * 6/2015 Short ................... F16J 15/3412
9,279,455 B2 * 3/2016 Tokunaga ............. F01D 25/168
9,291,200 B2 * 3/2016 Tokunaga ............... F16C 33/74
9,353,865 B2 * 5/2016 Lattin .................. F16J 15/3412
9,371,912 B2 * 6/2016 Hosoe .................. F16J 15/3424
9,470,267 B2 * 10/2016 Tokunaga .............. F16J 15/342
9,587,745 B2 * 3/2017 Itadani ................... F16J 15/348
9,611,938 B1 * 4/2017 Itadani .................. F16C 17/045
9,677,670 B2 * 6/2017 Itadani ................... F16J 15/342
9,765,892 B2 * 9/2017 Itadani .................. F16C 17/045
9,829,109 B2 * 11/2017 Itadani ................... F16J 15/348
9,845,886 B2 * 12/2017 Itadani .................... F16C 33/72
9,850,953 B2 * 12/2017 Tokunaga ............. F01D 25/186
9,951,873 B2 * 4/2018 Inoue ..................... F16J 15/162
9,982,784 B2 * 5/2018 Osada ...................... F16J 15/34
10,072,759 B2 * 9/2018 Inoue ..................... F16J 15/342
10,113,648 B2 * 10/2018 Inoue ..................... F16J 15/162
10,337,560 B2 * 7/2019 Tokunaga ............... F16C 33/80
10,337,620 B2 * 7/2019 Tokunaga ............ F16J 15/3412
10,473,220 B2 * 11/2019 Tokunaga ............ F16C 33/107
10,487,948 B2 * 11/2019 Inoue ..................... F16J 15/342
10,495,228 B2 * 12/2019 Itadani ..................... F16J 15/34
10,626,995 B2 * 4/2020 Itadani ................. F16J 15/3448
10,704,417 B2 * 7/2020 Tokunaga ............ F16J 15/3412
10,781,924 B2 * 9/2020 Inoue ..................... F16J 15/162
10,883,603 B2 * 1/2021 Inoue .................. F16J 15/3412
10,883,604 B2 * 1/2021 Inoue ..................... F16J 15/162
11,009,072 B2 * 5/2021 Kimura .................... F16J 15/34
11,009,130 B2 5/2021 Itadani ..................... F16J 15/34
11,125,335 B2 9/2021 Kimura et al. .......... F16J 15/34
11,739,844 B2 * 8/2023 Katori ................. F16J 15/3464 277/361
11,821,521 B2 11/2023 Imura .................... F16J 15/342
11,933,303 B2 3/2024 Suzuki ................ F16J 15/3412
2002/0093141 A1 * 7/2002 Wang .................. F16J 15/3412 277/358
2003/0178781 A1 * 9/2003 Tejima ................ F16J 15/3424 277/399
2004/0080112 A1 * 4/2004 Tejima ................ F16J 15/3404 277/306
2005/0141789 A1 * 6/2005 Kita ...................... F16C 17/107 384/123
2005/0212217 A1 * 9/2005 Tejima ................ F16J 15/3412 277/399
2007/0296156 A1 * 12/2007 Yanagisawa ......... F16J 15/3412 277/352
2008/0100001 A1 * 5/2008 Flaherty .............. F16J 15/3412 277/400
2008/0272552 A1 * 11/2008 Zheng .................... F16J 15/442 277/400
2010/0066027 A1 * 3/2010 Vasagar ................. F16J 15/441 277/350
2011/0101616 A1 * 5/2011 Teshima ............... F16J 15/3424 277/358
2012/0018957 A1 * 1/2012 Watanabe ............. F16J 15/441 277/387
2013/0189294 A1 * 7/2013 Koelle ................... A61K 40/11 424/231.1
2013/0209011 A1 * 8/2013 Tokunaga ............... F16C 33/74 384/123
2014/0167361 A1 * 6/2014 Osada ...................... F16J 15/34 277/400
2014/0217676 A1 * 8/2014 Hosoe ...................... F16J 15/40 277/350
2015/0115537 A1 * 4/2015 Tokunaga ............... F16J 15/40 277/348
2015/0123350 A1 * 5/2015 Itadani ................. F16J 15/3412 277/400
2015/0184752 A1 * 7/2015 Itadani ................. F16J 15/3412 277/400
2015/0226334 A1 * 8/2015 Itadani .................. F16C 17/045 277/400
2015/0240950 A1 * 8/2015 Takahashi ............. F16J 15/363 277/377
2015/0260292 A1 * 9/2015 Inoue .................. F16J 15/3412 277/400
2015/0377297 A1 * 12/2015 Tokunaga ............ F16C 33/748 384/119
2016/0033045 A1 * 2/2016 Itadani .................. F16C 17/045 277/348
2016/0097457 A1 4/2016 Sun et al. ................ F16J 15/34
2016/0252182 A1 * 9/2016 Itadani ................... F16J 15/342 277/401

(56) References Cited

U.S. PATENT DOCUMENTS

2017/0198814 A1* 7/2017 Colombo ............ F16J 15/3412
2017/0234431 A1* 8/2017 Katori ................. F16J 15/3416 277/400
2017/0350407 A1 12/2017 Yamamoto .......... F16C 33/1045
2018/0073394 A1* 3/2018 Tokunaga ............ F16J 15/3412
2018/0128377 A1* 5/2018 Tokunaga ............ F16J 15/3412
2018/0128378 A1* 5/2018 Tokunaga ............ F16J 15/3412
2018/0135699 A1* 5/2018 Tokunaga .............. F16J 15/348
2019/0178386 A1* 6/2019 Arai ....................... F16C 17/04
2019/0203840 A1* 7/2019 Katori ................. F16J 15/3464
2019/0301522 A1* 10/2019 Negishi ................ F16C 17/045
2019/0316682 A1* 10/2019 Negishi ............... F16J 15/3416
2019/0331162 A1* 10/2019 Negishi ................ F16C 17/102
2019/0376558 A1* 12/2019 Kimura ................ F16C 33/743
2020/0182299 A1* 6/2020 Kimura ................ F16C 17/026
2020/0224768 A1 7/2020 Imura et al. ............ F16J 15/34
2021/0048062 A1 2/2021 Masumi .............. F16J 15/3412
2021/0355992 A1 11/2021 Tokunaga .............. F16C 17/10
2022/0120313 A1 4/2022 Ou ....................... F16C 17/024
2023/0228292 A1 7/2023 Negishi ................ F16C 17/028
2024/0209891 A1 6/2024 Uchida ............... F16J 15/3412

FOREIGN PATENT DOCUMENTS

CN 101749431 6/2010 ............... F16J 15/34
CN 101776152 7/2010 ............... F16J 15/48
CN 103267132 8/2013 ............... F16J 15/54
CN 103732958 4/2014 ............... F16J 15/34
CN 103791097 5/2014 ............... F16J 15/34
CN 104019237 9/2014 ............... F16J 15/16
CN 104165229 11/2014 ............... F16J 15/40
CN 104919229 9/2015 ............... F16J 15/34
CN 105683632 6/2016 ............... F16J 15/34
CN 106439037 2/2017 ............... F16J 15/34
CN 206017723 3/2017 ............... F16J 15/16
CN 107166036 9/2017 ............... F16J 15/16
CN 107532724 1/2018 ............... F16J 15/34
CN 108506494 9/2018 ............... F16J 15/34
DE 3619489 12/1987 ............... F16J 15/34
DE 4407453 9/1995 ............... F16C 17/08
EP 0637706 8/1993 ............... F16J 15/34
EP 0896163 2/1999 ............... F16C 33/10
EP 2520835 11/2012 ............... F16J 15/34
EP 2626604 8/2013 ............... F16J 15/34
EP 2977655 1/2016 ............... F16J 15/34
EP 3091258 11/2016 ............... F16J 15/34
EP 3299686 3/2018 ............... F16J 15/34
EP 3922872 12/2021 ............... F16J 15/34
EP 3926187 12/2021 ............... F16C 17/04
EP 3926188 12/2021 ............... F16C 17/04
EP 3943765 1/2022 ............... F16C 17/04
JP 36-6305 5/1961
JP S49-33614 9/1974 ............... F16J 15/34
JP S54-77305 6/1979 ............... B06B 9/10
JP S55-177549 12/1980 ............... F16J 15/16
JP S57-146955 9/1982 ............... F16J 15/34
JP 58-109771 6/1983 ............... F16J 15/34
JP 58-137667 8/1983 ............... F16J 15/40
JP S59-58252 4/1984 ............... F16J 15/34
JP S60-107461 7/1985 ............... B63H 23/36
JP S6182177 5/1986 ............... F16J 15/34
JP S62-37572 2/1987 ............... F16J 51/34
JP S63-033027 3/1988 ............... F16C 33/46
JP S63-190975 8/1988 ............... F16J 15/34
JP H01133572 9/1989 ............... F16J 15/34
JP 2-236067 9/1990 ............... F16J 15/34
JP 3-14371 2/1991 ............... F16J 15/34
JP 3-35372 4/1991 ............... F16J 15/34
JP 3-41267 4/1991 ............... F16J 15/34
JP 3-41268 4/1991 ............... F16J 15/34
JP 3-108972 11/1991 ............... F16J 15/34
JP H04-73 1/1992 ............... F16J 15/34
JP H04-145267 5/1992 ............... F16J 15/34
JP H04-96671 8/1992 ............... F16J 15/34
JP H05-90048 12/1993 ............... F16J 15/34
JP H05-322050 12/1993 ............... F16J 15/34
JP 6-66374 3/1994 ............... F16J 15/34
JP H07-55016 3/1995 ............... F16J 15/34
JP H08-89489 4/1996 ............... A61B 5/05
JP H09-503276 3/1997 ............... F16J 15/34
JP H09-329247 12/1997 ............... F16J 15/34
JP H10-38093 2/1998 ............... F16J 15/34
JP H10-281299 10/1998 ............... F16J 15/34
JP 2000-179543 6/2000 ............... F16C 17/10
JP 2001-295833 10/2001 ............... F16C 17/04
JP 2001-317638 11/2001 ............... F16J 15/34
JP 2003-161322 6/2003 ............... F16C 33/10
JP 2003-343741 12/2003 ............... F16J 15/34
JP 2004-003578 1/2004 ............... F16J 15/34
JP 2005-180652 7/2005 ............... F16J 15/34
JP 2005-188651 7/2005 ............... F16J 15/34
JP 2005-58051 12/2005 ............... F16C 33/74
JP 2006-9828 1/2006 ............... F16C 17/02
JP 2006-022834 1/2006 ............... F16J 15/34
JP 2006-77899 3/2006 ............... F16J 15/34
JP 2008-144864 6/2008 ............... F16C 33/10
JP 2009-250378 10/2009 ............... F16J 15/34
JP 2010-133496 6/2010 ............... F16J 15/34
JP 2010-216587 9/2010 ............... F16J 15/34
JP 2011-185292 9/2011 ............... F16J 15/34
JP 2012-2295 1/2012 ............... F16J 15/34
JP 5271858 5/2013 ............... F16J 15/34
JP 2016-80090 5/2016 ............... F16J 15/34
JP 2017-141961 8/2017 ............... F16J 15/34
JP 6444492 12/2018 ............... F16J 15/34
JP 2019-15401 1/2019 ............... F16J 15/34
JP 2019-173953 10/2019 ............... F16J 15/34
JP 2020-173020 10/2020 ............... F16C 33/74
WO WO9506212 3/1995 ............... F16J 15/34
WO WO9506832 3/1995 ............... F16J 15/34
WO WO2012046749 4/2012 ............... F16J 15/34
WO WO2014024742 2/2014 ............... F16J 15/34
WO WO2014050920 4/2014 ............... F16J 15/34
WO WO2014103630 7/2014 ............... F16J 15/34
WO WO2014112455 7/2014 ............... F16J 15/34
WO WO2014148316 9/2014 ............... F16J 15/34
WO WO2014174725 10/2014 ............... F16J 15/34
WO WO215199171 12/2015 ............... F16J 15/34
WO WO2016009408 1/2016 ............... F16J 15/34
WO WO2016035860 3/2016 ............... F16J 15/34
WO WO2016167262 10/2016 ............... F16J 15/34
WO WO2016186019 11/2016 ............... F16J 15/34
WO WO2016203878 12/2016 ............... F16J 15/34
WO WO2017002774 1/2017 ............... F16J 15/34
WO WO2017061406 4/2017 ............... F16J 15/34
WO WO2018034197 2/2018 ............... F16J 15/34
WO WO2018088353 5/2018 ............... F16J 15/34
WO WO218105505 6/2018 ............... F16J 15/34
WO WO2018139231 8/2018 ............... F16J 15/34
WO WO2018139232 8/2018 ............... F16C 33/10
WO WO2019044671 3/2019 ............... F16C 17/04
WO WO2019069887 4/2019 ............... F16J 15/34
WO WO2020162025 12/2019 ............... F16C 17/04
WO WO2020032086 2/2020 ............... F16J 15/34
WO WO2020085122 4/2020 ............... F16J 15/34

OTHER PUBLICATIONS

International Search Report and Written Opinion and International Preliminary Report on Patentability issued in PCT/JP2022/025794, dated Sep. 6, 2022, 25 pages.
Official Action issued in related U.S. Appl. No. 17/928,571, dated Jul. 1, 2024, 7 pages.
Korean Official Action issued in related application serial No. 10-2022-7043001, dated Aug. 26, 2024, with English translation, 17 pages.
Official Action issued in related U.S. Appl. No. 17/928,580, dated Sep. 11, 2024, 12 pages.
Notice of Allowance issued in related U.S. Appl. No. 17/928,571, dated Sep. 18, 2024, 4 pages.
U.S. Appl. No. 17/928,580, filed Nov. 29, 2022, Negishi et al.

(56) References Cited

OTHER PUBLICATIONS

U.S. Appl. No. 17/928,571, filed Nov. 29, 2022, Negishi et al.
U.S. Appl. No. 18/288,369, filed Oct. 25, 2023, Uchida et al.

* cited by examiner

ROTATION DIRECTION
OF MATING-SIDE SEAL RING
S2(F)
10
F2
13
13A
13B
12A
11(12)
F3
16A
16
S1(A)
19
F4
F1
18
16B

S2(F)
ROTATION DIRECTION
OF MATING-SIDE SEAL RING
10
F2'
13
13A
13B
12A
11(12)
F3'
16A
S1(A)
16
19
F4'
F1'
18
16B

ROTATION DIRECTION
OF MATING-SIDE SEAL RING
S2(F)
S1(A)
313
313A
313B
313a
311
19
316
316A
316B
316a
F10
F11
F12
F13
18
310

ROTATION DIRECTION
OF MATING-SIDE SEAL RING
S2(F)
310
18
F13'
F12'
316a
316B
316A
316
313a
F10'
F11'
313
313A
313B
19
311
S1(A)

ROTATION DIRECTION
OF MATING-SIDE SEAL RING
S2(F)
510
F2
13
F3
F1
F4
18
19
C
F6
511
S1(A)
F5
532
530
531
532a
531a
530a

ROTATION DIRECTION
OF MATING-SIDE SEAL RING
S2(F)
S1(A)
510
511
13
18
19
F1'
F2'
F3'
F4'
F5'
F6'
F7
530
531
532
532a
531a
530a 710
16
13
730
711
S1(A)
ROTATION DIRECTION
OF MATING-SIDE SEAL RING
S2(F)
17
18
19

810
13
16
19
S1(A)
ROTATION DIRECTION
OF MATING-SIDE SEAL RING
S2(F)
818

910
13
19
16
S1(A)
ROTATION DIRECTION
OF MATING-SIDE SEAL RING
S2(F)
18

SLIDING COMPONENTS

TECHNICAL FIELD

The present invention relates to sliding components, for example, sliding components used in a shaft seal or a bearing.

BACKGROUND ART

As sliding components that prevent a leakage of a sealed fluid around a rotating shaft in a rotating machine, for example, a mechanical seal has been known that is formed of a pair of annular sliding rings which rotate relative to each other and of which sliding surfaces slide against each other. In such a mechanical seal, in recent years, the reduction of energy loss caused by sliding has been desired for environmental measures or the like, and dynamic pressure generating grooves may be provided in the sliding surface of the sliding ring.

For example, in a mechanical seal disclosed in Patent Citation 1, a plurality of dynamic pressure generating grooves are provided in a circumferential direction in a sliding surface of one sliding ring, the dynamic pressure generating grooves communicating with a space on a sealed fluid side that is a radially outer side of the sliding surface, and extending in a radially inward direction while inclining in one circumferential direction.

During relative rotation between the sliding rings, since the sealed fluid concentrates from the space on the sealed fluid side toward closed end portions of the dynamic pressure generating grooves, and a positive pressure is generated, the sliding surfaces are separated from each other, and a fluid film of the sealed fluid is formed between the sliding surfaces, so that lubricity can be improved, and the sliding surfaces smoothly slide against each other.

CITATION LIST

Patent Literature

Patent Citation 1: WO 2020/162025 A (PAGE 14 and FIG. 10)

SUMMARY OF INVENTION

Technical Problem

Depending on the type of a rotating machine to which the mechanical seal as in Patent Citation 1 is applied, since the rotation direction of the sliding rings may be switched according to the situation, a mechanical seal capable of accommodating both relative rotation directions of the sliding rings has been desired. However, in the mechanical seal of Patent Citation 1, during relative rotation between the sliding rings, lubricity can be improved due to a positive pressure generated by the dynamic pressure generating grooves, however, relative rotation between the sliding rings in a reverse direction has not been taken into consideration, during relative rotation between the sliding rings in the reverse direction, a positive pressure cannot be generated in the dynamic pressure generating grooves, and the lubricity between the sliding surfaces cannot be improved.

The present invention is conceived in view of such problems, and an object of the present invention is to provide sliding components that allow sliding surfaces to smoothly slide against each other regardless of whether a relative rotation direction is a forward rotation or a reverse rotation.

Solution to Problem

In order to solve the foregoing problems, according to the present invention, there is provided sliding components including: a pair of sliding surfaces disposed to face each other at a location where a relative rotation takes place when a rotating machine is driven, the sliding surfaces consisting of a first sliding surface and a second sliding surface, a radially inner-side space and a radially outer-side space of the sliding surfaces consisting of a first space and a second space, wherein the first sliding surfaces is provided with a first dynamic pressure generating groove communicating with the first space and extending from a side of the first space toward a first circumferential direction, a second dynamic pressure generating groove extending from a side of the second space toward a second circumferential direction opposed to the first circumferential direction, and a conduit groove communicating with the first space, and the second dynamic pressure generating groove is disposed closer to the first space than the conduit groove, and communicates with the conduit groove. According to the aforesaid feature of the present invention, during relative rotation in the first circumferential direction when the rotating machine is driven, a fluid in the first space is supplied from a closed end portion of the first dynamic pressure generating groove to a gap between the sliding surfaces. In addition, during relative rotation in the second circumferential direction when the rotating machine is driven, the fluid in the first space is supplied from a closed end portion of the second dynamic pressure generating groove through the conduit groove to the gap between the sliding surfaces. For this reason, lubricity between the sliding surfaces is good regardless of the relative rotation direction.

It may be preferable that a land extending in a circumferential direction is provided between the first dynamic pressure generating groove and the second dynamic pressure generating groove. According to this preferable configuration, since positive pressures generated by the first dynamic pressure generating groove and the second dynamic pressure generating groove are generated at the same land, the state of separation between the sliding surfaces is substantially the same regardless of the relative rotation direction.

It may be preferable that a closed end portion of the first dynamic pressure generating groove and a closed end portion of the second dynamic pressure generating groove face each other in a radial direction. According to this preferable configuration, the fluid supplied from one dynamic pressure generating groove to the gap between the sliding surfaces is efficiently collected in the other dynamic pressure generating groove disposed to face the one dynamic pressure generating groove.

It may be preferable that the conduit groove includes an annular groove and a communication groove communicating between the annular groove and the first space. According to the fourth aspect, the annular groove can reliably collect the fluid flowing between the sliding surfaces from the first space toward the second space. In addition, since the annular groove can store a large amount of the fluid, the fluid is reliably supplied to the second dynamic pressure generating groove.

It may be preferable that the first dynamic pressure generating groove and the second dynamic pressure generating groove are spiral grooves. According to this preferable configuration, the first dynamic pressure generating groove and the second dynamic pressure generating groove can be densely disposed in the circumferential direction.

It may be preferable that the communication groove extends not to intersect the first dynamic pressure generating groove and the second dynamic pressure generating groove. According to this preferable configuration, the communication groove does not interfere with the generation of dynamic pressures of the first dynamic pressure generating groove and the second dynamic pressure generating groove.

It may be preferable that a third dynamic pressure generating groove is provided in the first sliding surface so as to be closer to a side of the second space than the conduit groove. According to this preferable configuration, since the third dynamic pressure generating groove is provided so as to be closer to the second space than the conduit groove, lubricity or sealing performance between the sliding surfaces is further enhanced by a dynamic pressure generated in the third dynamic pressure generating groove.

It may be preferable that the third dynamic pressure generating groove is a bent groove communicating with the conduit groove. According to this preferable configuration, the state of a dynamic pressure of the third dynamic pressure generating groove changes depending on the relative rotation direction of the sliding surfaces.

DESCRIPTION OF EMBODIMENTS

Figure 1:
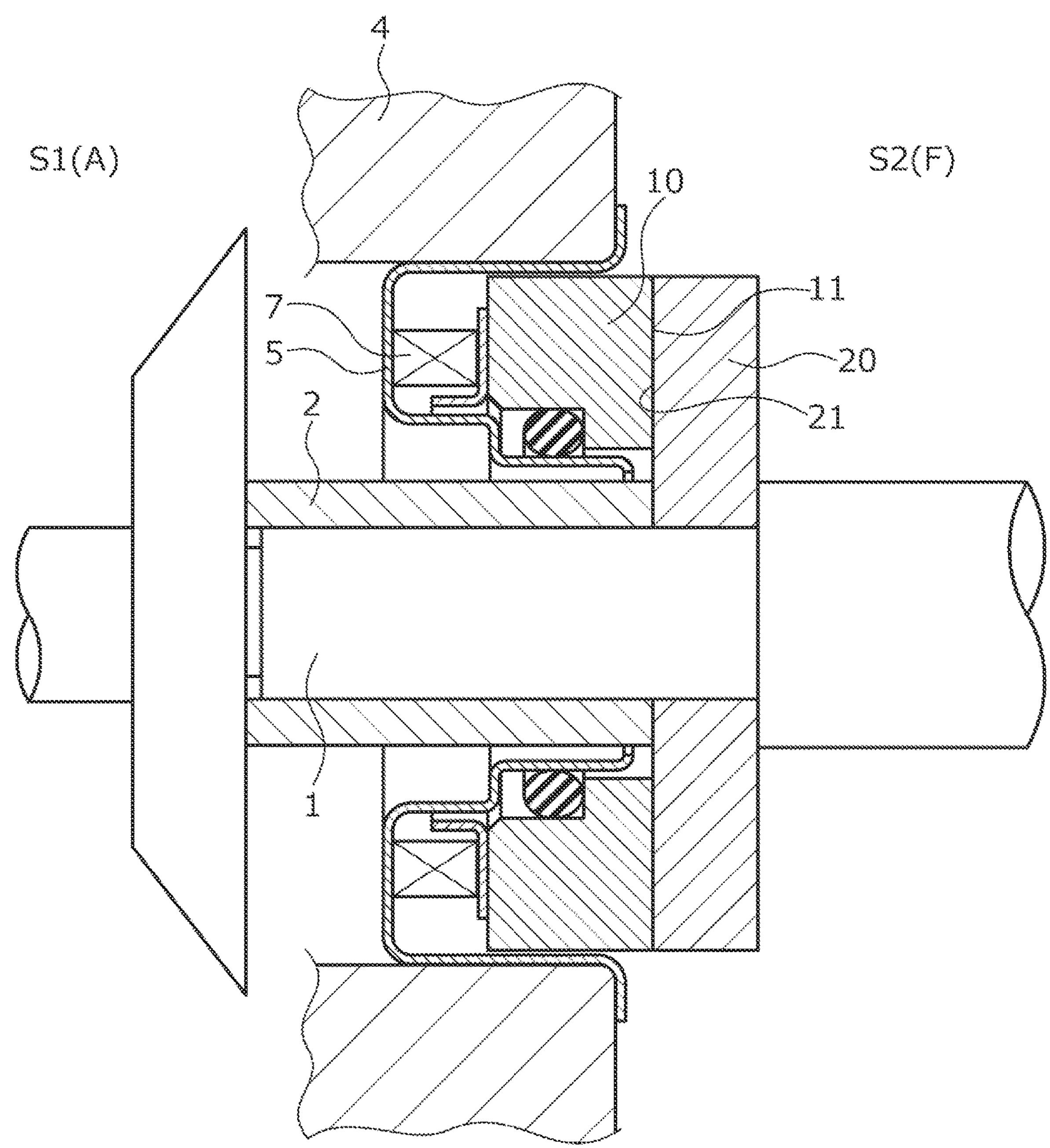
FIG. 1 is a longitudinal section view illustrating one example of a mechanical seal including sliding components according to a first embodiment of the present invention.

Modes for implementing sliding components according to the present invention will be described below based on embodiments.

First Embodiment

A mechanical seal as sliding components according to a first embodiment of the present invention will be described with reference to FIGS. 1 to 4. Further, in the present embodiment, atmosphere A exists in an inner space S1 of the mechanical seal and a sealed fluid F exists in an outer space S2. A radially inner side of sliding rings forming the mechanical seal will be described as a leakage side (low-pressure side) that is the second space, and a radially outer side will be described as a sealed fluid side (high-pressure side) that is first space. In addition, for convenience of description, in the drawings, dots may be added to grooves and the like formed in a sliding surface.

The mechanical seal for automobiles illustrated in FIG. 1 is an inside mechanical seal that seals the sealed fluid F in the outer space S2, which tends to leak from the radially outer side of the sliding surface toward the radially inner side, and the inner space S1 communicates with the atmosphere A. Further, in the present embodiment, a mode will be illustrated in which the sealed fluid F is a high-pressure liquid and the atmosphere A is a gas with a lower pressure than that of the sealed fluid F.

The mechanical seal is mainly formed of a rotating seal ring 20 as the other sliding ring, and a stationary seal ring 10 as one sliding ring. The rotating seal ring 20 has an annular shape, and is provided on a rotating shaft 1 with a sleeve 2 sandwiched therebetween so as to be rotatable together with the rotating shaft 1. The stationary seal ring 10 has an annular shape, and is provided on a seal cover 5 fixed to a housing 4 of an attached device, so as to be non-rotatable and movable in an axial direction. The stationary seal ring 10 is biased in the axial direction by an elastic member 7. A sliding surface 11 of the stationary seal ring 10 and a sliding surface 21 of the rotating seal ring 20 are in close contact and slide against each other. Further, the sliding surface 21 of the rotating seal ring 20 is a flat surface, and a recessed portion such as a groove is not provided in the flat surface.

The stationary seal ring 10 and the rotating seal ring 20 are typically made of SiC (as an example of hard material) or a combination of SiC and carbon (as an example of soft material), however, the present invention is not limited to these materials, and any sliding material that is used as a sliding material for mechanical seals can be applied. Further, examples of SiC include sintered bodies using boron, aluminum, carbon, or the like as a sintering aid, and materials consisting of two or more phases with different components and compositions, for example, SiC dispersed with graphite particles, reaction-sintered SiC consisting of SiC and Si, SiC—TiC, SiC—TiN, and the like, and a carbon mixture of carbonaceous and graphite, resin-molded carbon, sintered carbon, and the like can be used as carbon. In addition, in addition to the above-described sliding materials, metal materials, resin materials, surface modification materials (e.g., coating materials), composite materials, and the like can also be applied.

Figure 2:
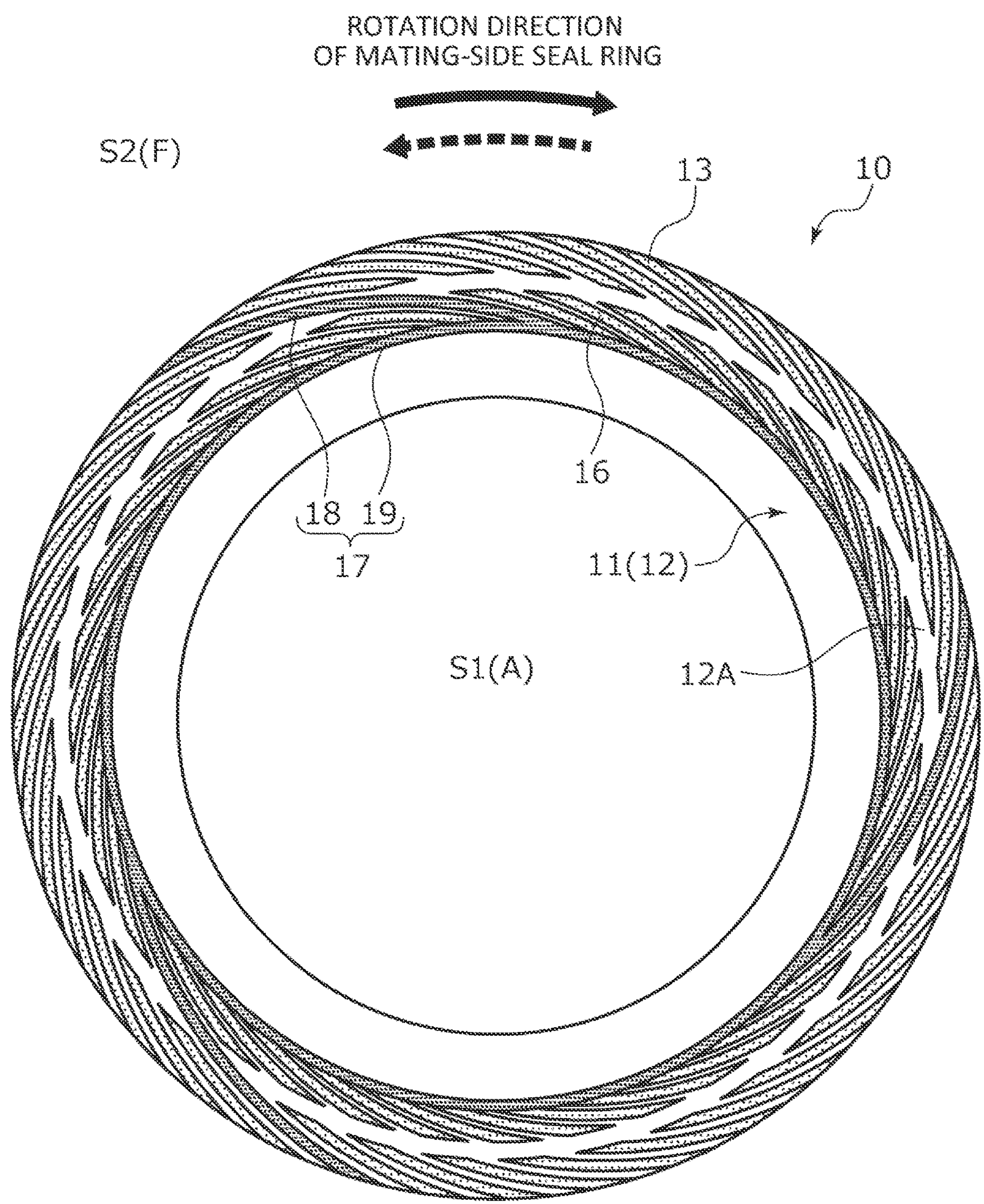
FIG. 2 is a view of a sliding surface of a stationary seal ring in the first embodiment when viewed in an axial direction.
Figure 3:
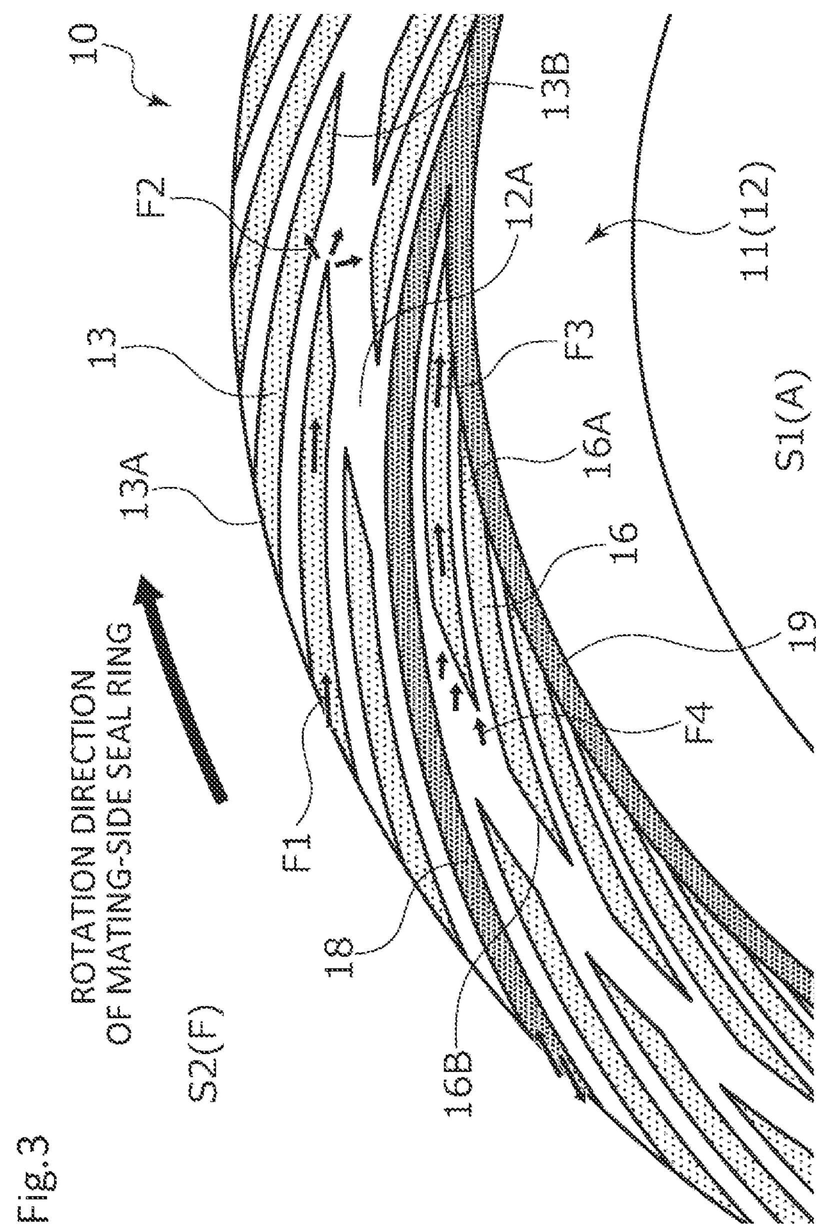
FIG. 3 is an enlarged view of the sliding surface of the stationary seal ring during forward rotation of a rotating seal ring in the first embodiment when viewed in the axial direction.
Figure 4:
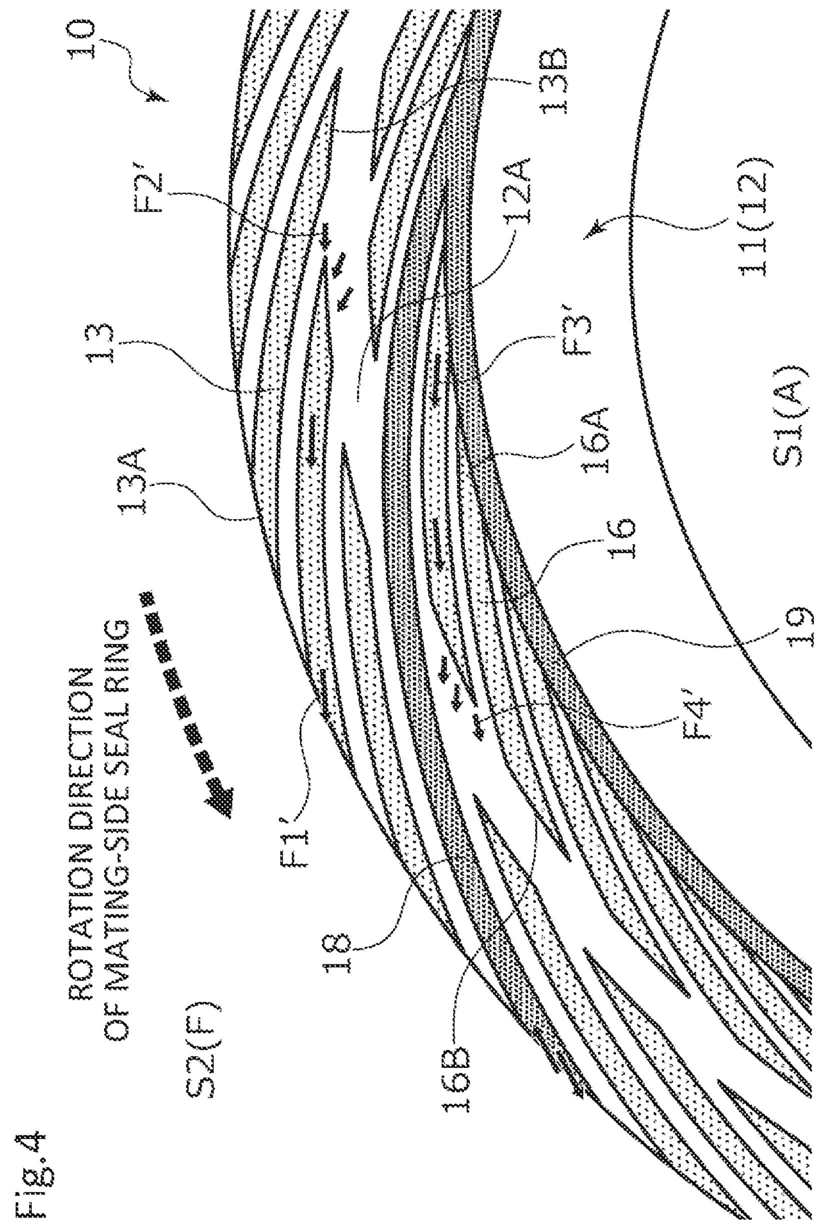
FIG. 4 is an enlarged view of the sliding surface of the stationary seal ring during reverse rotation of the rotating seal ring in the first embodiment when viewed in the axial direction.

As illustrated in FIGS. 2 to 4, the rotating seal ring 20 slides relative to the stationary seal ring 10 clockwise as indicated by a solid arrow or counterclockwise indicated by a dashed arrow. Hereinafter, the direction of the solid arrow will be described as a forward rotation direction of the rotating seal ring 20, and the direction of the dashed arrow will be described as a reverse rotation direction of the rotating seal ring 20.

The sliding surface 11 of the stationary seal ring 10 is provided with a plurality of first dynamic pressure generating grooves 13, a plurality of second dynamic pressure generating grooves 16, and one conduit groove 17. The conduit groove 17 is formed of a plurality of communication grooves 18 and an annular groove 19.

The plurality (33 in the present embodiment) of first dynamic pressure generating grooves 13 are disposed in a circumferential direction on a radially outer side of the sliding surface 11. The first dynamic pressure generating grooves 13 communicate with the outer space S2 at end portions 13A on the radially outer side thereof, and extend in the forward rotation direction of the rotating seal ring 20 with respect to the locations of communication with the outer space S2, namely, in one circumferential direction. In detail, the first dynamic pressure generating grooves 13 are spiral grooves extending in an arcuate shape while inclining with clockwise components from the radially outer side toward the radially inner side. In addition, end portions 13B on the radially inner side of the first dynamic pressure generating grooves 13 have a closed shape, namely, are closed end portions.

The first dynamic pressure generating grooves 13 have a constant depth in an extending direction.

The plurality (33 in the present embodiment) of second dynamic pressure generating grooves 16 are disposed in the circumferential direction on the radially outer side of the annular groove 19. The second dynamic pressure generating grooves 16 communicate with the annular groove 19 at end portions 16A on the radially inner side thereof, and extend in the reverse rotation direction of the rotating seal ring 20 with respect to the locations of communication with the annular groove 19, namely, in the other circumferential direction. In detail, the second dynamic pressure generating grooves 16 are spiral grooves extending in an arcuate shape while inclining with counterclockwise components from the radially inner side toward the radially outer side. In addition, end portions 16B on the radially outer side of the second dynamic pressure generating grooves 16 have a closed shape, namely, are closed end portions.

The second dynamic pressure generating grooves 16 have a constant depth in an extending direction. Further, in the present embodiment, the depth of the second dynamic pressure generating grooves 16 is the same as the depth of the first dynamic pressure generating grooves 13.

In addition, the end portions 13B on the radially inner side of the first dynamic pressure generating grooves 13 and the end portions 16B on the radially outer side of the second dynamic pressure generating grooves 16 are disposed to face each other in a radial direction with a land 12A to be described later interposed therebetween.

The plurality (3 in the present embodiment) of communication grooves 18 are uniformly disposed in the circumferential direction on the radially outer side of the sliding surface 11. The communication grooves 18 communicate with the outer space S2, and extend in an arcuate shape while inclining with clockwise components from the radially outer side toward the radially inner side.

In detail, the communication grooves 18 extend substantially parallel to the first dynamic pressure generating grooves 13 and the second dynamic pressure generating grooves 16 when viewed in the axial direction. In other words, the communication grooves 18 extend not to intersect the first dynamic pressure generating grooves 13 and the second dynamic pressure generating grooves 16.

In addition, the communication grooves 18 are formed to be longer in an extending direction than the first dynamic pressure generating grooves 13. A predetermined number (11 each in the present embodiment) of the first dynamic pressure generating grooves 13 and the second dynamic pressure generating grooves 16 are disposed between the communication grooves 18 adjacent to each other in the circumferential direction.

The communication grooves 18 have a constant depth in the extending direction. Further, the depth of the communication grooves 18 is formed to be deeper than the depth of the first dynamic pressure generating grooves 13 and the second dynamic pressure generating grooves 16.

The annular groove 19 is formed in an annular shape in an axial view, and an end portion on the radially inner side of each of the communication grooves 18 communicates with the annular groove 19. In other words, the annular groove 19 communicates with the outer space S2 through each of the communication grooves 18.

The annular groove 19 has a constant depth in the circumferential direction. Further, in the present embodiment, the depth of the annular groove 19 is the same as the depth of the communication grooves 18.

In addition, portions of the sliding surface 11 other than the first dynamic pressure generating grooves 13, the second dynamic pressure generating grooves 16, the communication grooves 18, and the annular groove 19 form a land 12 having flat surfaces disposed on the same plane. The flat surfaces of the land 12 function as a sliding surface substantially sliding against the sliding surface 21 of the rotating seal ring 20.

In detail, the land 12 includes lands between the first dynamic pressure generating grooves 13 adjacent to each other in the circumferential direction; lands between the first dynamic pressure generating grooves 13 and the communication grooves 18 adjacent to each other in the circumferential direction; lands between the second dynamic pressure generating grooves 16 adjacent to each other in the circumferential direction; lands between the second dynamic pressure generating grooves 16 and the communication grooves 18 adjacent to each other in the circumferential direction; the land 12A disposed between the first dynamic pressure generating grooves 13 and the second dynamic pressure generating grooves 16 separated from each other in the radial direction, and extending in the circumferential direction; and an annular land located closer to the radially inner side than the annular groove 19, and these lands form the flat surfaces of the land 12 disposed on the same plane.

Next, the operation of the stationary seal ring 10 and the rotating seal ring 20 during relative rotation in the forward direction will be described with reference to FIG. 3.

First, when the rotating seal ring 20 is not in rotation and is stopped, the sealed fluid F flows from openings of the end portions 13A into the first dynamic pressure generating grooves 13, and flows from openings on the radially outer side of the communication grooves 18 through the communication grooves 18 and the annular groove 19 into the second dynamic pressure generating grooves 16. Further, since the stationary seal ring 10 is biased to a rotating seal ring 20 side by the elastic member 7, the sliding surfaces 11 and 21 are in the state of contact with each other, and almost no sealed fluid F between the sliding surfaces 11 and 21 leaks into the inner space S1.

As illustrated in FIG. 3, when the rotating seal ring 20 rotates relative to the stationary seal ring 10 in the forward direction, the sealed fluid F inside the first dynamic pressure generating grooves 13 and the second dynamic pressure generating grooves 16 moves in the forward rotation direction while following the rotating seal ring 20, due to shear with the sliding surface 21.

Specifically, inside the first dynamic pressure generating grooves 13, as indicated by arrow F1, the sealed fluid F moves from the openings of the end portions 13A on the radially outer side toward the end portions 13B on the radially inner side. Accordingly, the pressure is increased at the end portions 13B and in the vicinities thereof. Namely, a positive pressure is generated at the end portions 13B of the first dynamic pressure generating grooves 13 and at the land 12A in the vicinities thereof.

In addition, the sliding surfaces 11 and 21 are slightly separated from each other by a force generated by the positive pressure generated at the end portions 13B of the first dynamic pressure generating grooves 13 and at the land 12A in the vicinities thereof (not illustrated). In detail, an absolute value of the positive pressure generated by the first dynamic pressure generating grooves 13 is larger than an absolute value of a negative pressure generated by the second dynamic pressure generating grooves 16 to be described later.

Accordingly, as indicated by arrow F2, the sealed fluid F inside the first dynamic pressure generating grooves 13 mainly flows into a gap between the sliding surfaces 11 and 21. Since the sealed fluid F is interposed between the sliding surfaces 11 and 21 in such a manner, even during low-speed rotation, lubricity can be improved, and wear between the sliding surfaces 11 and 21 can be suppressed. Further, since a floating distance between the sliding surfaces 11 and 21 is small, the amount of leakage of the sealed fluid F into the outer space S2 is small.

In addition, at this time, since the sliding surfaces 11 and 21 are slightly separated from each other, the sealed fluid F inside the communication grooves 18 and the annular groove 19 also flows into the gap between the sliding surfaces 11 and 21. For this reason, the sealed fluid F efficiently flows into the gap between the sliding surfaces 11 and 21.

On the other hand, inside the second dynamic pressure generating grooves 16, as indicated by arrow F3, the sealed fluid F moves from the end portions 16B on the radially outer side toward the end portions 16A on the radially inner side. Accordingly, the fluid pressure in the vicinities of the end portions 16B becomes relatively lower than a surrounding fluid pressure. In other words, a relative negative pressure is generated in the vicinities of the end portions 16B, and as indicated by arrow F4, the sealed fluid F between the sliding surfaces 11 and 21 is suctioned into the second dynamic pressure generating grooves 16.

The sealed fluid F suctioned into the second dynamic pressure generating grooves 16 is collected in the annular groove 19. The annular groove 19 communicates with the outer space S2 through the communication grooves 18, so that the sealed fluid F can flow in and out. For this reason, when a larger amount of the sealed fluid F than an amount that can be stored in the annular groove 19 is collected, the excess sealed fluid F is returned to the outer space S2.

Next, the operation of the stationary seal ring 10 and the rotating seal ring 20 during relative rotation in the reverse direction will be described with reference to FIG. 4.

As illustrated in FIG. 4, when the rotating seal ring 20 rotates relative to the stationary seal ring 10 in the reverse direction, the sealed fluid F inside the first dynamic pressure generating grooves 13 and the second dynamic pressure generating grooves 16 moves in the reverse rotation direction while following the rotating seal ring 20, due to shear with the sliding surface 21.

Specifically, inside the first dynamic pressure generating grooves 13, as indicated by arrow F1', the sealed fluid F moves from the end portions 13B on the radially inner side toward the openings of the end portions 13A on the radially outer side. Accordingly, the fluid pressure in the vicinities of the end portions 13B becomes relatively lower than a surrounding fluid pressure. In other words, a relative negative pressure is generated in the vicinities of the end portions 13B, and as indicated by arrow F2', the sealed fluid F between the sliding surfaces 11 and 21 is suctioned into the first dynamic pressure generating grooves 13.

The sealed fluid F suctioned into the first dynamic pressure generating grooves 13 is returned from the openings of the end portions 13A on the radially outer side to the outer space S2.

On the other hand, inside the second dynamic pressure generating grooves 16, as indicated by arrow F3', the sealed fluid F moves from the end portions 16A on the radially inner side toward the end portions 16B on the radially outer side. Accordingly, the pressure is increased at the end portions 16B and in the vicinities thereof. Namely, a positive pressure is generated at the end portions 16B of the second dynamic pressure generating grooves 16 and at the land 12A in the vicinities thereof.

In addition, the sliding surfaces 11 and 21 are slightly separated from each other by a force generated by the positive pressure generated at the end portions 16B of the second dynamic pressure generating grooves 16 and at the land 12A in the vicinities thereof (not illustrated). In detail, an absolute value of the positive pressure generated by the second dynamic pressure generating grooves 16 is larger than an absolute value of a negative pressure generated by the first dynamic pressure generating grooves 13 described above. Accordingly, as indicated by arrow F4', the sealed fluid F inside the second dynamic pressure generating grooves 16 mainly flows into the gap between the sliding surfaces 11 and 21.

As described above, when the rotating seal ring 20 rotates relative to the stationary seal ring 10 in the forward direction, the sealed fluid F in the outer space S2 is supplied from the end portions 13B of the first dynamic pressure generating grooves 13 into the gap between the sliding surfaces 11 and 21. In addition, when the rotating seal ring 20 rotates relative to the stationary seal ring 10 in the reverse direction, the sealed fluid F in the outer space S2 is supplied through the communication grooves 18 and the annular groove 19 from the end portions 16B of the second dynamic pressure generating grooves 16 into the gap between the sliding surfaces 11 and 21. For this reason, lubricity between the sliding surfaces 11 and 21 is good regardless of the relative rotation direction.

In addition, when the rotating seal ring 20 rotates relative to the stationary seal ring 10 in the forward direction, a relative negative pressure is generated in the vicinities of the end portions 16B of the second dynamic pressure generating grooves 16, and the sealed fluid F between the sliding surfaces 11 and 21 is suctioned. In addition, when the rotating seal ring 20 rotates relative to the stationary seal ring 10 in the reverse direction, a relative negative pressure is generated in the vicinities of the end portions 13B of the first dynamic pressure generating grooves 13, and the sealed fluid F between the sliding surfaces 11 and 21 is suctioned. For this reason, the leakage of the sealed fluid F to an inner space S1 side is suppressed.

In addition, the land 12A extending in the circumferential direction is provided between the first dynamic pressure generating grooves 13 and the second dynamic pressure generating grooves 16. According to this configuration, since the positive pressures generated at the end portions 13B of the first dynamic pressure generating grooves 13 and at the end portions 16B of the second dynamic pressure generating grooves 16 are generated at the same land 12A, the state of separation between the sliding surfaces 11 and 21 is substantially the same regardless of the relative rotation direction.

In addition, the end portions 13B of the first dynamic pressure generating grooves 13 and the end portions 16B of the second dynamic pressure generating grooves 16 face each other in the radial direction with the land 12A interposed therebetween. According to this configuration, when the rotating seal ring 20 rotates relative to the stationary seal ring 10 in the forward direction, the sealed fluid F supplied from the end portions 13B of the first dynamic pressure generating grooves 13 into the gap between the sliding surfaces 11 and 21 is efficiently collected at the end portions 16B of the second dynamic pressure generating grooves 16 disposed to face the first dynamic pressure generating grooves 13. In addition, when the rotating seal ring 20 rotates relative to the stationary seal ring 10 in the reverse direction, the sealed fluid F supplied from the end portions 16B of the second dynamic pressure generating grooves 16 into the gap between the sliding surfaces 11 and 21 is efficiently collected at the end portions 13B of the first dynamic pressure generating grooves 13 disposed to face the second dynamic pressure generating grooves 16. Accordingly, an excessive increase in positive pressure is suppressed regardless of the speed of relative rotation.

In addition, the conduit groove 17 is formed of the annular groove 19 and the communication grooves 18 that communicate between the annular groove 19 and the outer space S2. According to this configuration, since the annular groove 19 is disposed closer to the inner space S1 side than the first dynamic pressure generating grooves 13 and the second dynamic pressure generating grooves 16, the sealed fluid F flowing between the sliding surfaces 11 and 21 from the outer space S2 toward the inner space S1 can be reliably collected. In addition, since the annular groove 19 can store a large amount of the sealed fluid F, the sealed fluid F is reliably supplied into the second dynamic pressure generating grooves 16.

In addition, the plurality of communication grooves 18 are provided in the circumferential direction of the annular groove 19. Accordingly, the sealed fluid F is efficiently introduced or discharged from the plurality of communication grooves 18.

In addition, since a large amount of the sealed fluid F exists in the communication grooves 18 that are deep grooves, the sealed fluid F is easily supplied into the gap between the sliding surfaces 11 and 21 that are slightly separated from each other due to relative rotation.

In addition, the first dynamic pressure generating grooves 13 and the second dynamic pressure generating grooves 16 are spiral grooves extending in the radial direction while inclining in the circumferential direction. According to this configuration, the first dynamic pressure generating grooves 13 and the second dynamic pressure generating grooves 16 can be densely disposed in the circumferential direction. In other words, the degree of freedom in the design of the stationary seal ring 10 is high.

In addition, the communication grooves 18 extend not to intersect the first dynamic pressure generating grooves 13 and the second dynamic pressure generating grooves 16. For example, since the communication grooves 18 are disposed to cross the land 12A between the end portions 13B of the first dynamic pressure generating grooves 13 and the end portions 16B of the second dynamic pressure generating grooves 16, the communication grooves 18 do not interfere with the generation of dynamic pressures of the first dynamic pressure generating grooves 13 and the second dynamic pressure generating grooves 16.

In addition, since the communication grooves 18 extend parallel to the first dynamic pressure generating grooves 13 and the second dynamic pressure generating grooves 16, the first dynamic pressure generating grooves 13 and the second dynamic pressure generating grooves 16 can be more densely disposed in the circumferential direction.

Second Embodiment

Next, a mechanical seal as sliding components according to a second embodiment of the present invention will be described with reference to FIG. 5. Further, the descriptions of configurations that are the same and overlap with the configurations of the first embodiment will be omitted.

A stationary seal ring 210 of the mechanical seal according to the second embodiment differs from the stationary seal ring 10 according to the first embodiment in the configuration of the conduit groove, and other configurations are the same as in the stationary seal ring 10 according to the first embodiment.

Figure 5:
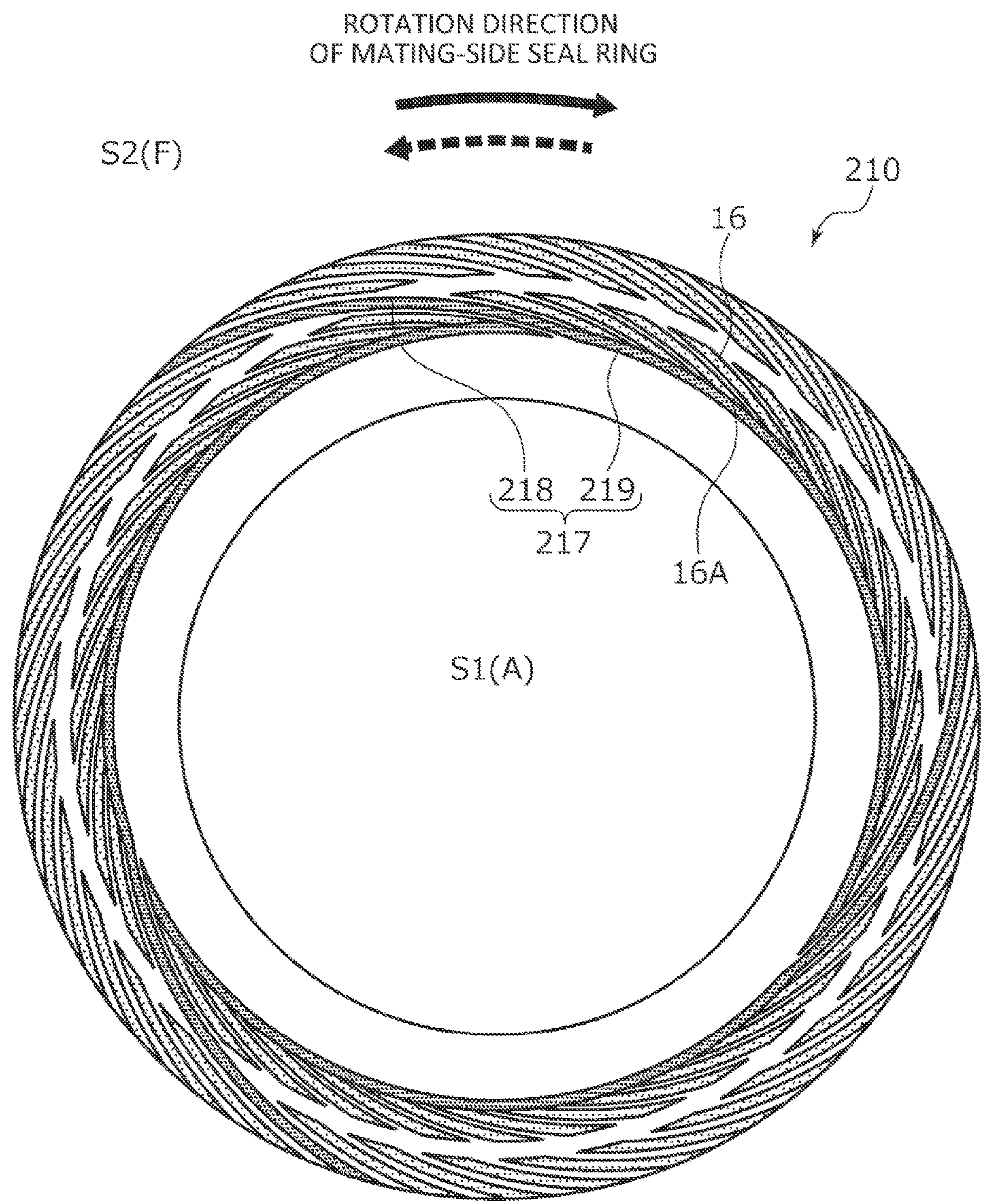
FIG. 5 is a view of a sliding surface of a stationary seal ring of sliding components according to a second embodiment of the present invention when viewed in the axial direction.

As illustrated in FIG. 5, a conduit groove 217 of the stationary seal ring 210 is formed of a communication groove 218 and an arcuate groove 219. The arcuate groove 219 extends from an end portion on the radially inner side of the communication groove 218 clockwise in the circumferential direction so as to be concentric with the stationary seal ring 210. A plurality (three in the present embodiment) of the conduit grooves 217 are provided in the circumferential direction.

The end portion 16A on the radially inner side of each of the second dynamic pressure generating grooves 16 communicates with the arcuate groove 219.

Third Embodiment

Next, a mechanical seal as sliding components according to a third embodiment of the present invention will be described with reference to FIGS. 6 to 8. Further, the descriptions of configurations that are the same and overlap with the configurations of the first embodiment will be omitted.

A stationary seal ring 310 of the mechanical seal according to the third embodiment differs from the stationary seal ring 10 according to the first embodiment in the configurations of the first dynamic pressure generating grooves and the second dynamic pressure generating grooves, and other configurations are the same as in the stationary seal ring 10 according to the first embodiment.

Figure 6:
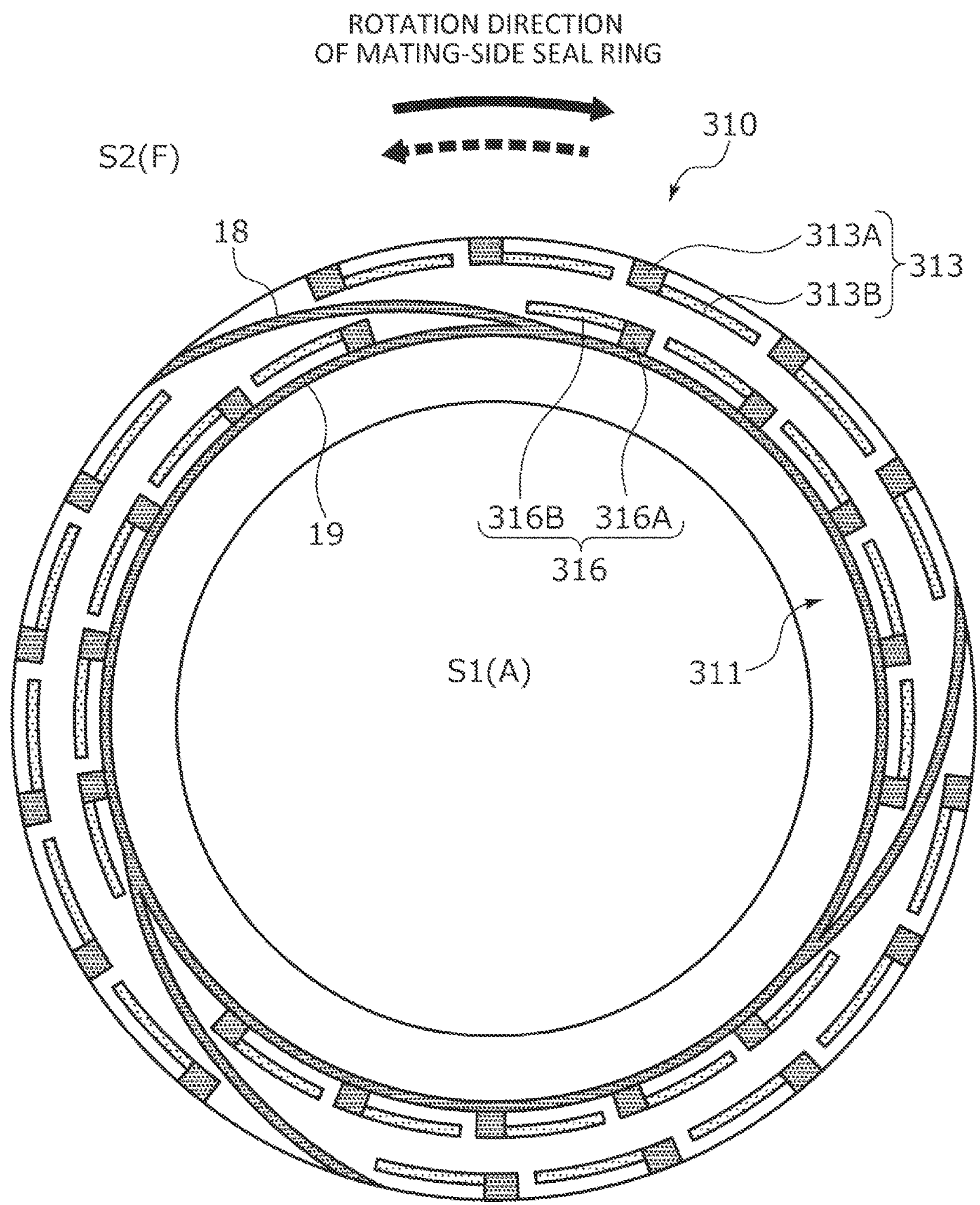
FIG. 6 is a view of a sliding surface of a stationary seal ring of sliding components according to a third embodiment of the present invention when viewed in the axial direction.

As illustrated in FIG. 6, a sliding surface 311 of the stationary seal ring 310 is provided with a plurality of first dynamic pressure generating mechanisms 313, a plurality of the communication grooves 18, the annular groove 19, and a plurality of second dynamic pressure generating mechanisms 316.

Each of the first dynamic pressure generating mechanisms 313 is formed of a first deep groove 313A and a first Rayleigh step 313B as a first dynamic pressure generating groove.

The first deep groove 313A communicates with the outer space S2 at an end portion on the radially outer side, and extends in a radially inward direction. The first deep groove 313A is formed to be slightly shallower than the communication grooves 18 and the annular groove 19.

The first Rayleigh step 313B extends clockwise in the circumferential direction from the radially inner side of the first deep groove 313A so as to be concentric with the stationary seal ring 310. The first Rayleigh step 313B is formed to be shallower than the first deep groove 313A.

Each of the second dynamic pressure generating mechanisms 316 is formed of a second deep groove 316A and a second Rayleigh step 316B as a second dynamic pressure generating groove.

The second deep groove 316A communicates with the annular groove 19 at an end portion on the radially inner side, and extends in a radially outward direction. The second deep groove 316A is formed to be slightly shallower than the communication grooves 18 and the annular groove 19. Further, the second deep groove 316A is formed with the same depth as the first deep groove 313A.

The second Rayleigh step 316B extends counterclockwise in the circumferential direction from the radially outer side of the second deep groove 316A so as to be concentric with the stationary seal ring 310. The second Rayleigh step 316B is formed to be shallower than the second deep groove 316A. Further, the second Rayleigh step 316B is formed with the same depth as the first Rayleigh step 313B.

Further, in the third embodiment, a mode has been illustrated in which the first deep groove 313A and the second deep groove 316A are formed to be slightly shallower than the communication grooves 18 and the annular groove 19, however, the first deep groove 313A and the second deep groove 316A may be formed with the same depth. In addition, the first deep groove 313A and the second deep groove 316A may be formed with the same depth as the first Rayleigh step 313B and the second Rayleigh step 316B.

Furthermore, in the third embodiment, a mode has been illustrated in which the first deep groove 313A and the second deep groove 316A are formed with the same depth, however, the first deep groove 313A and the second deep groove 316A may be formed with different depths. In addition, in the third embodiment, a mode has been illustrated in which the first Rayleigh step 313B and the second Rayleigh step 316B are formed with the same depth, however, the first Rayleigh step 313B and the second Rayleigh step 316B may be formed with different depths.

Next, the operation of the stationary seal ring 310 and the rotating seal ring 20 (refer to FIG. 1) during relative rotation in the forward direction will be described with reference to FIG. 7.

Figure 7:
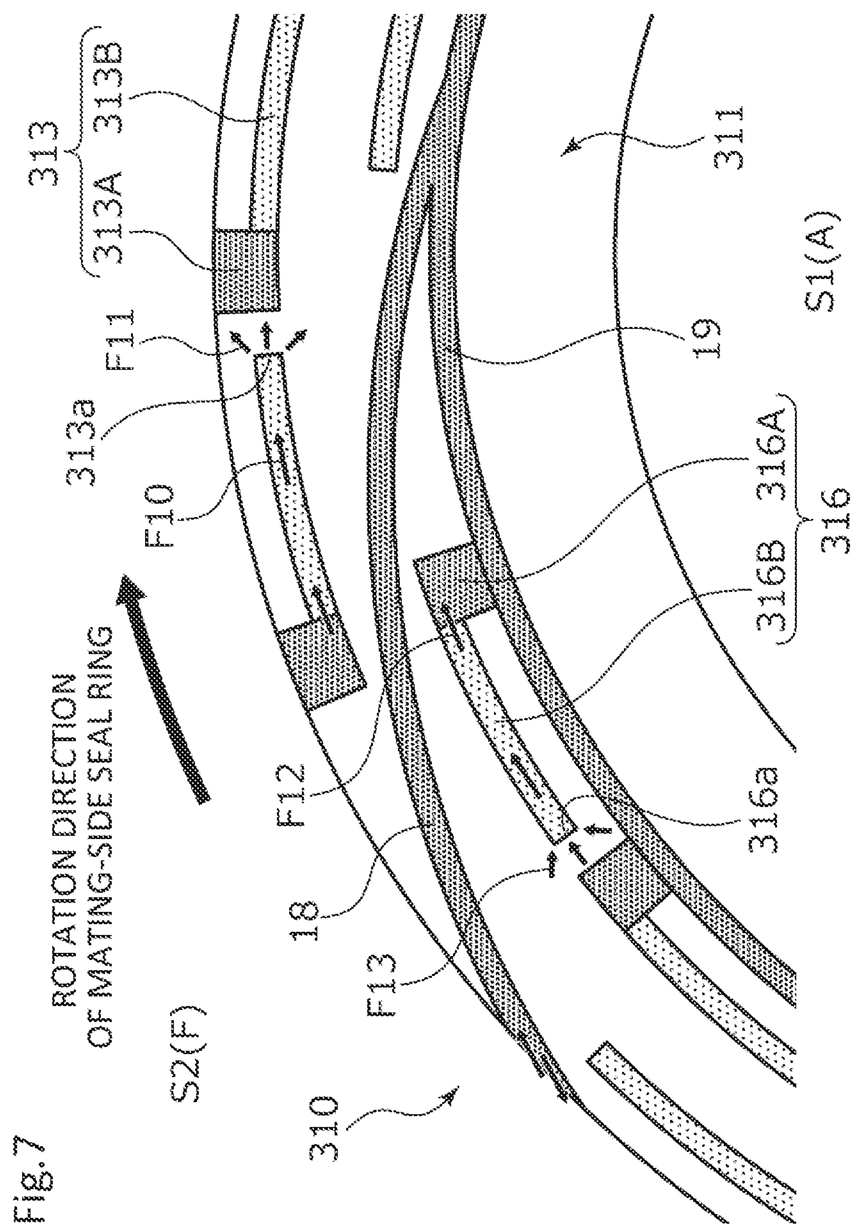
FIG. 7 is an enlarged view of the sliding surface of the stationary seal ring during forward rotation of the rotating seal ring in the third embodiment when viewed in the axial direction.

As illustrated in FIG. 7, when the rotating seal ring 20 rotates relative to the stationary seal ring 310 in the forward direction, the sealed fluid F inside the first dynamic pressure generating mechanisms 313 and the second dynamic pressure generating mechanisms 316 moves in the forward rotation direction while following the rotating seal ring 20, due to shear with the sliding surface 21.

Specifically, inside the first dynamic pressure generating mechanisms 313, as indicated by arrow F10, the sealed fluid F inside the first deep grooves 313A moves from communication portions between the first deep grooves 313A and the first Rayleigh steps 313B toward closed end portions 313*a* of the first Rayleigh steps 313B. Accordingly, a positive pressure is generated at the closed end portions 313*a* of the first Rayleigh steps 313B and in the vicinities thereof, and the sliding surfaces 311 and 21 are separated from each other, and as indicated by arrow F11, the sealed fluid F flows into a gap between the sliding surfaces 311 and 21.

In addition, at this time, inside the second dynamic pressure generating mechanisms 316, as indicated by arrow F12, the sealed fluid F inside the second Rayleigh steps 316B moves toward the second deep grooves 316A. Accordingly, a relative negative pressure is generated in the vicinities of closed end portions 316*a* of the second Rayleigh steps 316B, and as indicated by arrow F13, the sealed fluid F between the sliding surfaces 311 and 21 is suctioned into the second Rayleigh steps 316B.

Next, the operation of the stationary seal ring 310 and the rotating seal ring 20 (refer to FIG. 1) during relative rotation in the reverse direction will be described with reference to FIG. 8.

Figure 8:
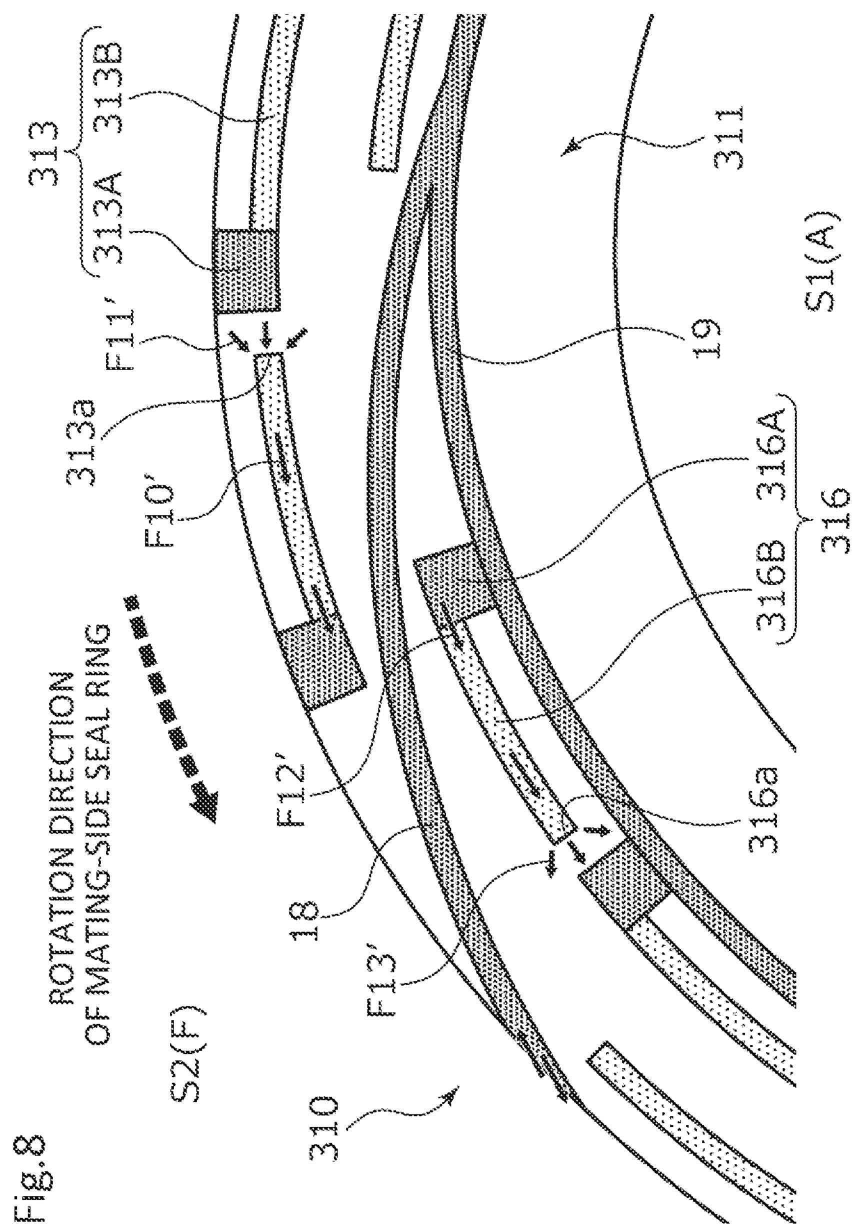
FIG. 8 is an enlarged view of the sliding surface of the stationary seal ring during reverse rotation of the rotating seal ring in the third embodiment when viewed in the axial direction.

As illustrated in FIG. 8, when the rotating seal ring 20 rotates relative to the stationary seal ring 310 in the reverse direction, the sealed fluid F inside the first dynamic pressure generating mechanisms 313 and the second dynamic pressure generating mechanisms 316 moves in the reverse rotation direction while following the rotating seal ring 20, due to shear with the sliding surface 21.

Specifically, inside the first dynamic pressure generating mechanisms 313, as indicated by arrow F10', the sealed fluid F inside the first Rayleigh steps 313B moves toward the first deep grooves 313A. Accordingly, a relative negative pressure is generated at the closed end portions 313*a* of the first Rayleigh steps 313B and in the vicinities thereof, and as indicated by arrow F11', the sealed fluid F between the sliding surfaces 311 and 21 is suctioned into the first Rayleigh steps 313B.

In addition, at this time, inside the second dynamic pressure generating mechanisms 316, as indicated by arrow F12', the sealed fluid F inside the second deep grooves 316A moves from communication portions between the second deep grooves 316A and the second Rayleigh steps 316B toward the closed end portions 316*a* of the second Rayleigh steps 316B. Accordingly, a positive pressure is generated at the closed end portions 316*a* of the second Rayleigh steps 316B and in the vicinities thereof, and the sliding surfaces 311 and 21 are separated from each other, and as indicated by arrow F13', the sealed fluid F flows into the gap between the sliding surfaces 311 and 21.

In such a manner, in the stationary seal ring 310 according to third embodiment, both lubricity and sealing performance between the sliding surfaces 311 and 21 can be achieved regardless of the relative rotation direction of the rotating seal ring 20.

Fourth Embodiment

Next, a mechanical seal as sliding components according to a fourth embodiment of the present invention will be described with reference to FIG. 9. Further, the descriptions of configurations that are the same and overlap with the configurations of the first embodiment will be omitted.

Figure 9:
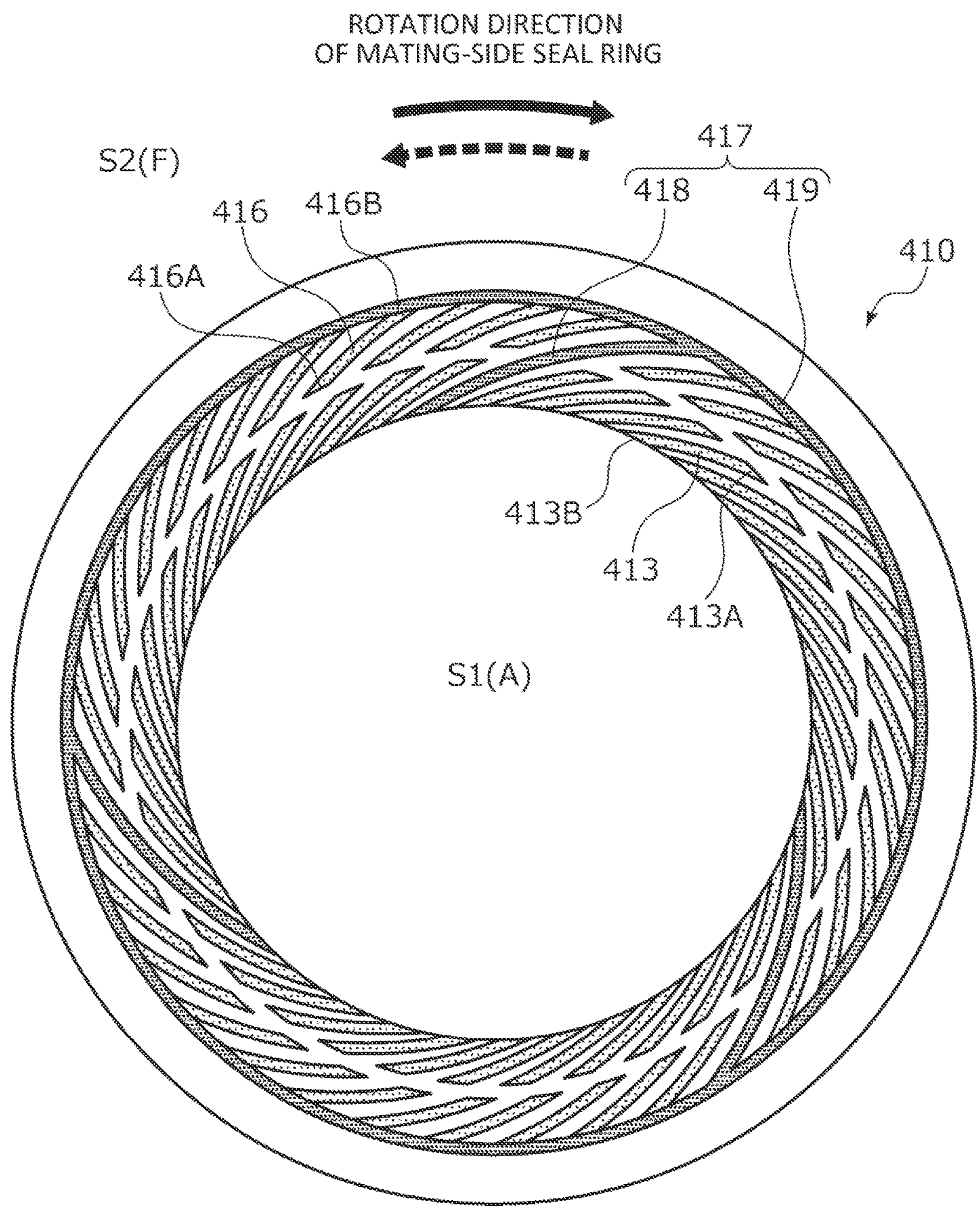
FIG. 9 is a view of a sliding surface of a stationary seal ring of sliding components according to a fourth embodiment of the present invention when viewed in the axial direction.

As illustrated in FIG. 9, the mechanical seal according to the fourth embodiment is an outside-typed mechanical seal in which the sealed fluid F exists in the inner space S1 and the atmosphere A exists in the outer space S2. Further, in the fourth embodiment, the inner space S1 functions as the first space, and the outer space S2 functions as the second space.

A stationary seal ring 410 of the mechanical seal according to the fourth embodiment is provided with a plurality of first dynamic pressure generating grooves 413, a plurality of communication grooves 418, an annular groove 419, and a plurality of second dynamic pressure generating grooves 416. The plurality of communication grooves 418 and the annular groove 419 form one conduit groove 417.

The first dynamic pressure generating grooves 413 communicate with the inner space S1 at end portions 413B on the radially inner side thereof, and extend in the forward rotation direction of the rotating seal ring 20 with respect to the locations of communication with the inner space S1, namely, in the one circumferential direction. In detail, the first dynamic pressure generating grooves 413 are spiral grooves extending in an arcuate shape while inclining with clockwise components from the radially inner side toward the radially outer side. In addition, end portions 413A on the radially outer side of the first dynamic pressure generating grooves 413 have a closed shape, namely, are closed end portions.

The communication grooves 418 communicate with the inner space S1, and extend in an arcuate shape while inclining with clockwise components from the radially inner side toward the radially outer side.

An end portion on the radially outer side of each of the communication grooves 418 communicates with the annular groove 419. In other words, the annular groove 419 communicates with the inner space S1 through each of the communication grooves 418.

The second dynamic pressure generating grooves 416 communicate with the annular groove 419 at end portions 416B on the radially outer side thereof, and extend in the reverse rotation direction of the rotating seal ring 20 with respect to the locations of communication with the annular groove 419, namely, in the other circumferential direction. In detail, the second dynamic pressure generating grooves 416 are spiral grooves extending in an arcuate shape while inclining with counterclockwise components from the radially outer side toward the radially inner side. In addition, end portions 416A on the radially inner side of the second dynamic pressure generating grooves 416 have a closed shape, namely, are closed end portions.

The mechanical seals according to the second and third embodiments may also be configured as an outside-typed mechanical seal by disposing grooves on the radially inner side. In addition, mechanical seals according to the fourth to sixth embodiments and first to third modification examples of the first embodiment to be described later may also be configured as an outside-typed mechanical seal by disposing grooves on the radially inner side.

Fifth Embodiment

Next, a mechanical seal as sliding components according to a fifth embodiment of the present invention will be described with reference to FIGS. 10 to 12. Further, the descriptions of configurations that are the same and overlap with the configurations of the first embodiment will be omitted.

A stationary seal ring 510 of the mechanical seal according to the fifth embodiment differs from the stationary seal ring 10 according to the first embodiment in that third dynamic pressure generating grooves 530 are provided, and other configurations are the same as in the stationary seal ring 10 according to the first embodiment.

Figure 10:
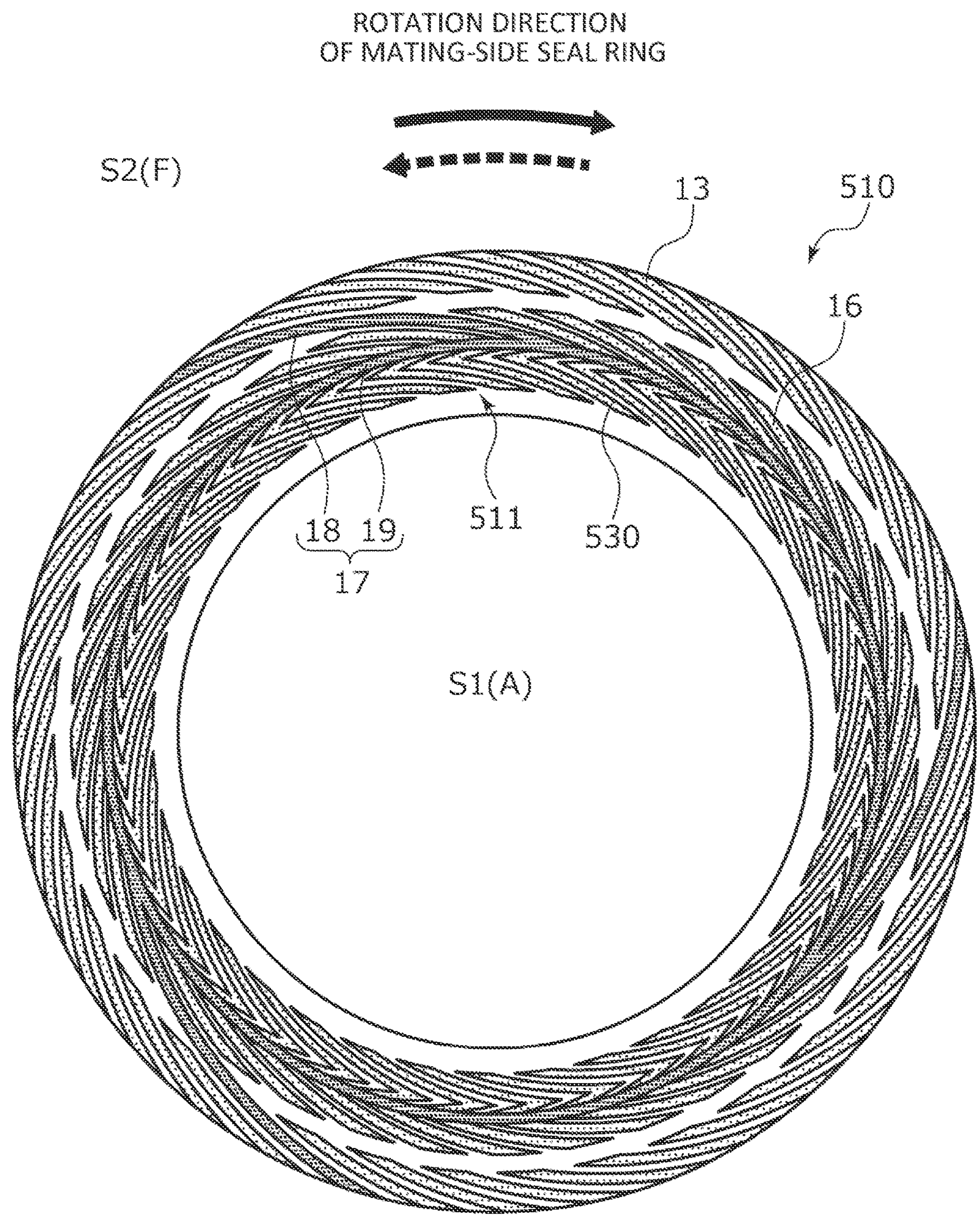
FIG. 10 is a view of a sliding surface of a stationary seal ring of sliding components according to a fifth embodiment of the present invention when viewed in the axial direction.

As illustrated in FIG. 10, in a sliding surface 511 of the stationary seal ring 510, a plurality (36 in the present embodiment) of the third dynamic pressure generating grooves 530 are provided in the circumferential direction on the radially inner side of the annular groove 19, namely, at a position where the first dynamic pressure generating grooves 13 and the second dynamic pressure generating grooves 16 are not provided.

Figure 11:
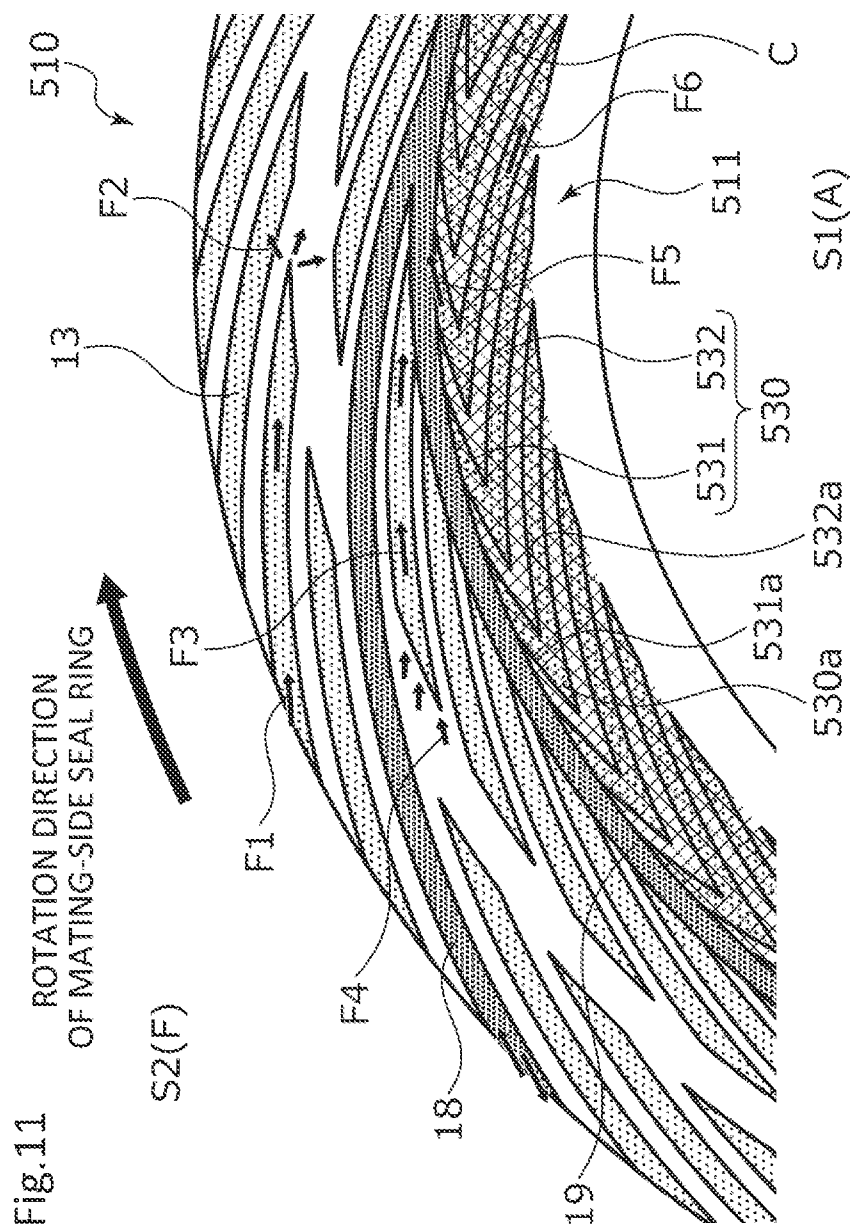
FIG. 11 is an enlarged view of the sliding surface of the stationary seal ring during forward rotation of the rotating seal ring in the fifth embodiment when viewed in the axial direction.
Figure 12:
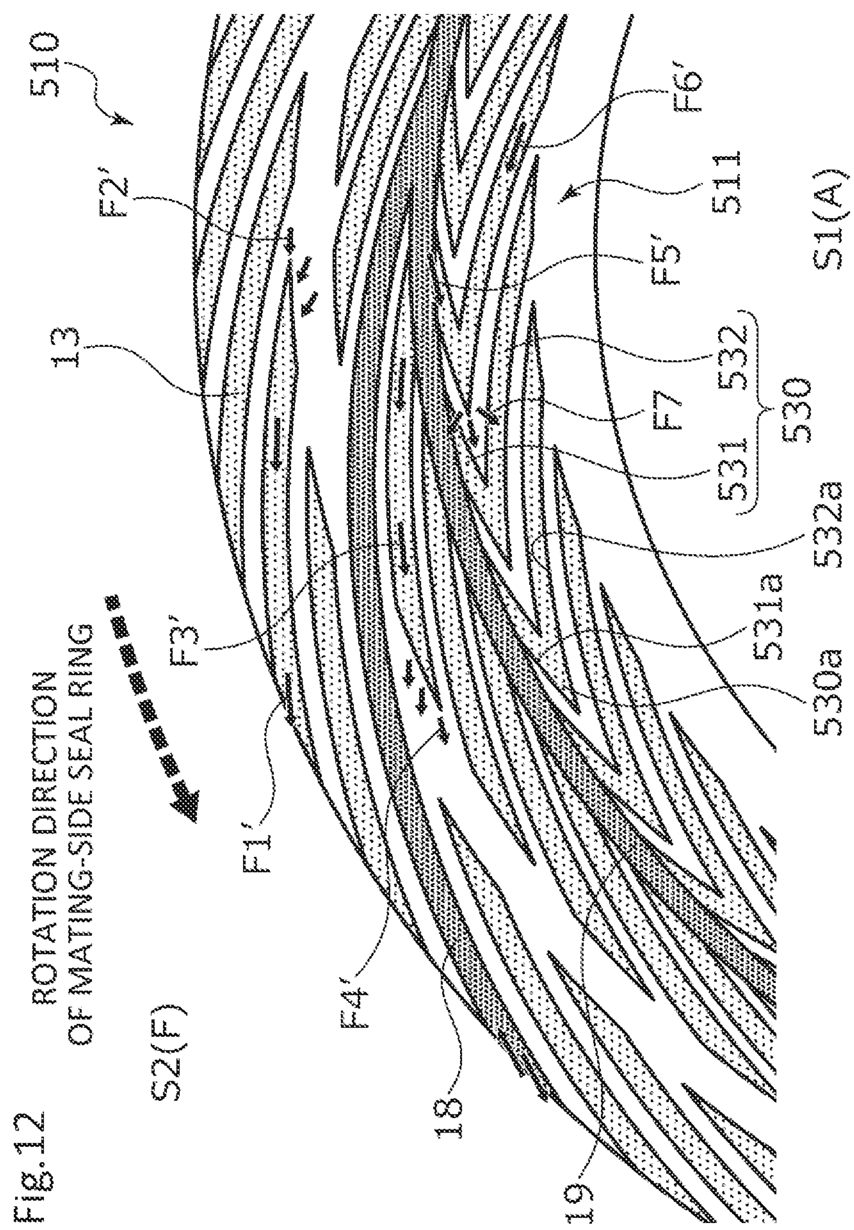
FIG. 12 is an enlarged view of the sliding surface of the stationary seal ring during reverse rotation of the rotating seal ring in the fifth embodiment when viewed in the axial direction.

As illustrated in FIGS. 11 and 12, the third dynamic pressure generating grooves 530 are bent grooves communicating with the annular groove 19 at end portions on the radially outer side. In detail, each of the third dynamic pressure generating grooves 530 includes a first inclined groove portion 531 and a second inclined groove portion 532. The third dynamic pressure generating grooves 530 have a constant depth in an extending direction. Further, the third dynamic pressure generating grooves 530 have the same depth as the first dynamic pressure generating grooves 13 and the second dynamic pressure generating grooves 16, but may be formed with a different depth.

The first inclined groove portion 531 extends in the radially inward direction with respect to the location of communication with the annular groove 19 while inclining in the reverse rotation direction of the rotating seal ring 20, namely, in the other circumferential direction. The second inclined groove portion 532 communicates with an end portion on the radially inner side of the first inclined groove portion 531, and extends in the forward rotation direction of the rotating seal ring 20 with respect to the location of communication with the first inclined groove portion 531, namely, in the radially inward direction while inclining in the one circumferential direction.

Each of the third dynamic pressure generating grooves 530 includes a corner portion 530*a* formed by a side surface 531*a* located in the reverse rotation direction and defining the first inclined groove portion 531 and a side surface 532*a* located in the reverse rotation direction and defining the second inclined groove portion 532.

In addition, one second inclined groove portion 532 is disposed on the radially inner side of the corner portions 530*a* of the third dynamic pressure generating grooves 530 adjacent to each other in the forward rotation direction. In addition, the second inclined groove portion 532 has a longer length in the extending direction than the first inclined groove portion 531. In addition, a closed end portion of the second inclined groove portion 532 is disposed closer to a forward rotation direction side than the corner portions 530*a* of the third dynamic pressure generating grooves 530 adjacent to each other in the forward rotation direction.

Next, the operation of the stationary seal ring 510 and the rotating seal ring 20 during relative rotation in the forward direction will be described with reference to FIG. 11.

As illustrated in FIG. 11, when the rotating seal ring 20 rotates relative to the stationary seal ring 510 in the forward direction, inside the first dynamic pressure generating grooves 13, the sealed fluid F moves as indicated by arrow F1, and as indicated by arrow F2, the sealed fluid F inside the first dynamic pressure generating grooves 13 mainly flows into a gap between the sliding surfaces 511 and 21. On the other hand, inside the second dynamic pressure generating grooves 16, the sealed fluid F moves as indicated by arrow F3, and as indicated by arrow F4, the sealed fluid F between the sliding surfaces 511 and 21 is suctioned into the second dynamic pressure generating grooves 16.

In addition, at this time, inside the first inclined groove portions 531 of the third dynamic pressure generating grooves 530, as indicated by arrow F5, the sealed fluid F moves toward the annular groove 19, and inside the second inclined groove portions 532, as indicated by arrow F6, the sealed fluid F moves toward the closed end portions on the radially inner side.

According to this configuration, the sealed fluid F inside the first inclined groove portions 531 moves toward the annular groove 19, and the sealed fluid F inside the second inclined groove portions 532 is discharged to the gap between the sliding surfaces 511 and 21. For this reason, the pressure inside the third dynamic pressure generating grooves 530 becomes a relative negative pressure, cavitation regions C are formed in the vicinities of the third dynamic pressure generating grooves 530 over the circumferential direction (refer to hatched portions in FIG. 11). Further, the hatched portions in FIG. 11 indicate the cavitation regions C, and are illustrated with greater emphasis than the actual representation.

In such a manner, since the cavitation regions C are formed on the radially inner side of the annular groove 19 in the sliding surface 511 of the stationary seal ring 510, the further movement of the sealed fluid F from the annular groove 19 toward the radially inner side is suppressed. Accordingly, the leakage of the sealed fluid F into the inner space S1 can be suppressed, and sealing performance between the sliding surfaces 511 and 21 can be secondarily improved.

In addition, since the third dynamic pressure generating grooves 530 include components extending in the radial direction, a large width in the radial direction of the cavitation regions C can be secured, and the sealed fluid F is less likely to leak into the inner space S1.

Next, the operation of the stationary seal ring 510 and the rotating seal ring 20 during relative rotation in the reverse direction will be described with reference to FIG. 12.

As illustrated in FIG. 12, when the rotating seal ring 20 rotates relative to the stationary seal ring 510 in the reverse direction, inside the first dynamic pressure generating grooves 13, the sealed fluid F moves as indicated by arrow F1', and as indicated by arrow F2', the sealed fluid F between the sliding surfaces 511 and 21 is suctioned into the first dynamic pressure generating grooves 13. On the other hand, inside the second dynamic pressure generating grooves 16, the sealed fluid F moves as indicated by arrow F3', and as indicated by arrow F4', the sealed fluid F inside the second dynamic pressure generating grooves 16 flows into the gap between the sliding surfaces 511 and 21.

In addition, at this time, inside the first inclined groove portions 531 of the third dynamic pressure generating grooves 530, as indicated by arrow F5', the sealed fluid F moves from the annular groove 19 toward the corner portions 530*a*, and inside the second inclined groove portions 532, as indicated by arrow F6', the sealed fluid F moves from the closed end portions on the radially inner side toward the corner portions 530*a*.

According to this configuration, the sealed fluid F concentrates and a positive pressure is generated at the corner portions 530*a* and in the vicinities thereof, and as indicated by arrow F7, the sealed fluid F inside the third dynamic pressure generating grooves 530 mainly flows into the gap between the sliding surfaces 511 and 21. Accordingly, lubricity between the sliding surfaces 511 and 21 can be secondarily improved.

In addition, since one second inclined groove portion 532 is disposed on the radially inner side of the corner portions 530*a* of the third dynamic pressure generating grooves 530 adjacent to each other in the forward rotation direction, the sealed fluid F that has flowed out of the corner portions 530*a* into the gap between the sliding surfaces 511 and 21 is collected in the one second inclined groove portion 532, and is less likely to leak into the inner space S1.

In addition, since the first inclined groove portions 531 are shorter than the second inclined groove portions 532, the corner portions 530*a* of the third dynamic pressure generating grooves 530 can be disposed toward the annular groove 19. In other words, since the corner portions 530*a* can be disposed away from the inner space S1, the sealed fluid F that has flowed out of the corner portions 530*a* into the gap between the sliding surfaces 511 and 21 is easily collected in the second inclined groove portions 532 or the annular groove 19 before reaching the inner space S1, and the sealed fluid F is even less likely to leak into the inner space S1.

Sixth Embodiment

Next, a mechanical seal as sliding components according to a sixth embodiment of the present invention will be described with reference to FIG. 13. Further, the descriptions of configurations that are the same and overlap with the configurations of the first embodiment will be omitted.

A stationary seal ring 610 of the mechanical seal according to the sixth embodiment differs from the stationary seal ring 10 according to the first embodiment in that third dynamic pressure generating grooves 630 are provided, and other configurations are the same as in the stationary seal ring 10 according to the first embodiment.

Figure 13:
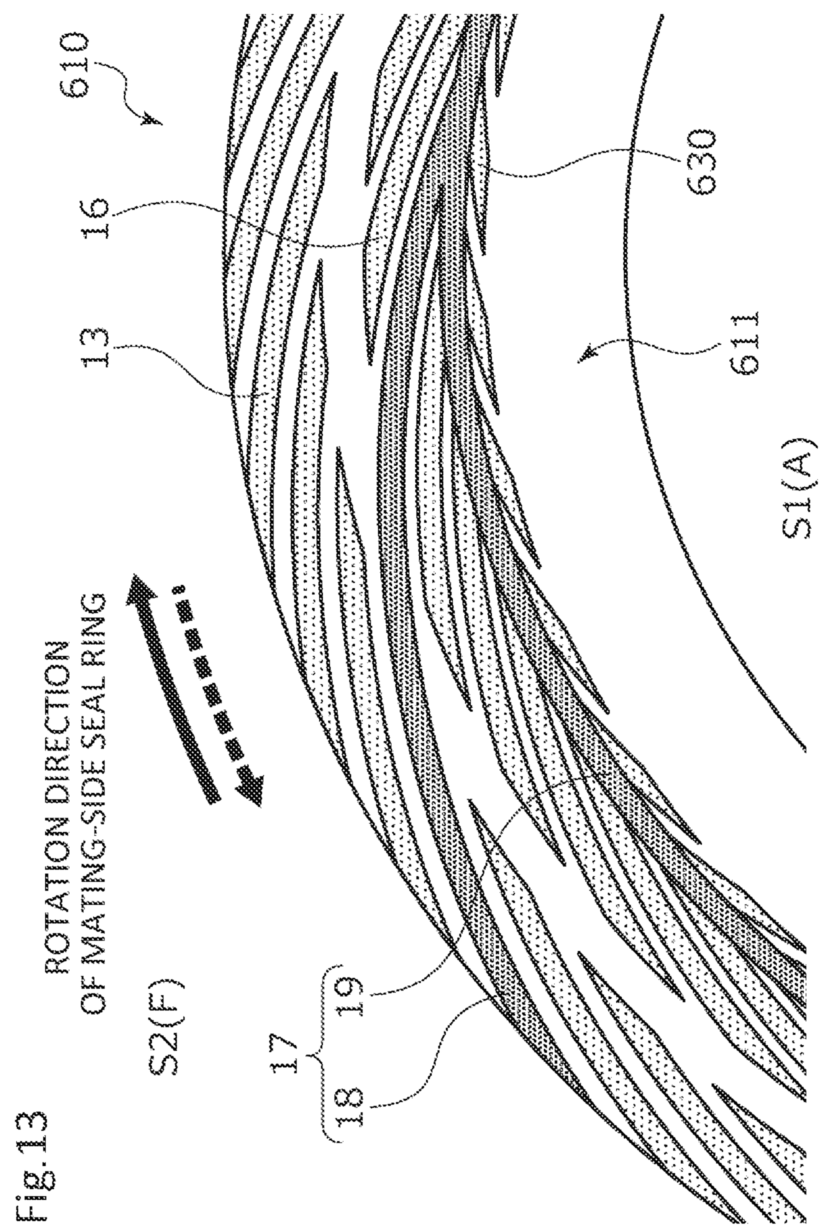
FIG. 13 is an enlarged view of a sliding surface of a stationary seal ring of sliding components according to a sixth embodiment of the present invention when viewed in the axial direction.

As illustrated in FIG. 13, in a sliding surface 611 of the stationary seal ring 610, a plurality of the third dynamic pressure generating grooves 630 are provided in the circumferential direction on the radially inner side of the annular groove 19. The third dynamic pressure generating grooves 630 communicate with the annular groove 19, and extend in the radially inward direction with respect to the locations of communication with the annular groove 19 while inclining in the reverse rotation direction of the rotating seal ring 20, namely, in the other circumferential direction.

When the rotating seal ring 20 rotates relative to the stationary seal ring 610 in the forward direction, a relative negative pressure is generated at closed end portions of the third dynamic pressure generating grooves 630 and in the vicinities thereof. Accordingly, sealing performance between the sliding surfaces 611 and 21 can be secondarily improved.

In addition, when the rotating seal ring 20 rotates relative to the stationary seal ring 610 in the reverse direction, a positive pressure is generated at the closed end portions of the third dynamic pressure generating grooves 630 and in the vicinities thereof. Accordingly, lubricity between the sliding surfaces 611 and 21 can be secondarily improved.

Further, a mode has been illustrated in which the third dynamic pressure generating grooves 630 according to the sixth embodiment extend in the radially inward direction from the locations of communication with the annular groove 19 while inclining in the reverse rotation direction of the rotating seal ring 20, however, the third dynamic pressure generating grooves 630 may extend in the radially inward direction from the locations of communication with the annular groove 19 while inclining in the forward rotation direction of the rotating seal ring 20. In this case, the lubricity can be secondarily improved during forward rotation of the rotating seal ring 20, and the sealing performance can be secondarily improved during reverse rotation of the rotating seal ring 20.

Seventh Embodiment

Next, a mechanical seal as sliding components according to a seventh embodiment of the present invention will be described with reference to FIG. 14. Further, the descriptions of configurations that are the same and overlap with the configurations of the first embodiment will be omitted.

A stationary seal ring 710 of the mechanical seal according to the seventh embodiment differs from the stationary seal ring 10 according to the first embodiment in that third dynamic pressure generating grooves 730 are provided, and other configurations are the same as in the stationary seal ring 10 according to the first embodiment.

Figure 14:
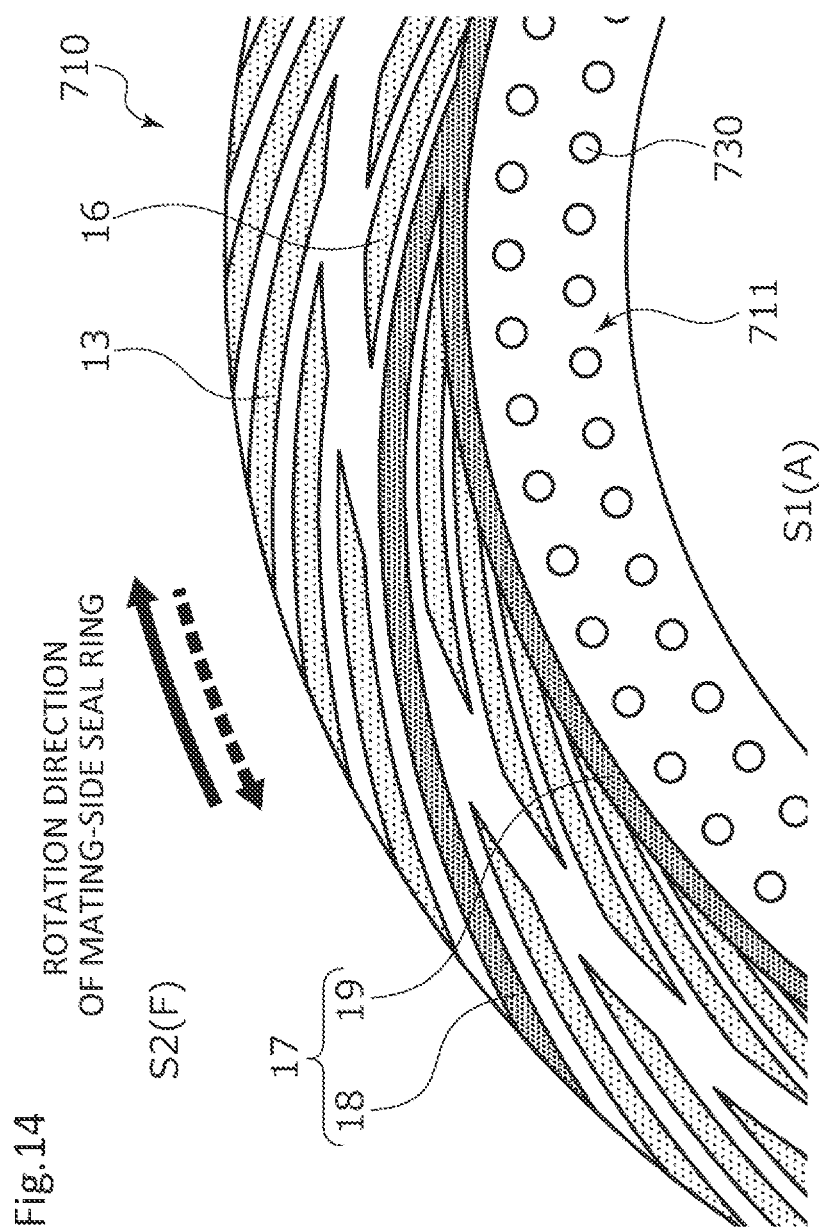
FIG. 14 is an enlarged view of a sliding surface of a stationary seal ring of sliding components according to a seventh embodiment of the present invention when viewed in the axial direction.

As illustrated in FIG. 14, in a sliding surface 711 of the stationary seal ring 710, a plurality of the third dynamic pressure generating grooves 730 are provided in the circumferential direction on the radially inner side of the annular groove 19. The third dynamic pressure generating grooves 730 are dimples having a circular shape in an axial view.

According to this configuration, a positive pressure is generated in the third dynamic pressure generating grooves 730 regardless of the rotation direction of the rotating seal ring 20. Namely, lubricity between the sliding surfaces 711 and 21 can be secondarily improved regardless of the rotation direction of the rotating seal ring 20.

Further, the third dynamic pressure generating grooves 730 are not limited to having a circular shape in an axial view, and may have a long hole such as a rectangular or elliptical shape in an axial view.

The embodiments of the present invention have been described above with reference to the drawings, however, the specific configurations are not limited to the embodiments, and modifications or additions that are made without departing from the scope of the present invention are included in the present invention.

For example, in the first to seventh embodiments, the mechanical seals for automobiles have been described as examples of the sliding components, but the present invention may be applied to other mechanical seals for general industrial machines.

In addition, in the first to seventh embodiments, the example has been described in which the first dynamic pressure generating grooves and the second dynamic pressure generating grooves are provided in the stationary seal ring, however, the first dynamic pressure generating grooves and the second dynamic pressure generating grooves may be provided in the rotating seal ring, or one or both of the first dynamic pressure generating grooves and the second dynamic pressure generating grooves may be provided on each of the stationary seal ring and the rotating seal ring.

In addition, in the first to seventh embodiments, the example has been described in which the communication grooves and the annular groove are provided in the stationary seal ring, however, the communication grooves and the annular groove may be provided in the rotating seal ring, or one or both of the communication grooves and the annular groove may be provided in each of the stationary seal ring and the rotating seal ring.

In addition, in the first to seventh embodiments, the sealed fluid side and the leakage side have been described as a high-pressure side and a low-pressure side, respectively, however, the sealed fluid side and the leakage side may have substantially the same pressure.

In addition, in the first to seventh embodiments, the sealed fluid F has been described as a high-pressure liquid, but is not limited thereto, and may be a gas or may be a mist mixture of liquid and gas.

In addition, in the first to seventh embodiments, the fluid on the leakage side has been described as the atmosphere A that is a low-pressure gas, but is not limited thereto, and may be a liquid or a high-pressure gas or may be a mist mixture of liquid and gas.

In addition, in the first to seventh embodiments, the mode has been illustrated in which the first dynamic pressure generating grooves and the second dynamic pressure generating grooves are curved and extended, however, the first dynamic pressure generating grooves and the second dynamic pressure generating grooves may extend linearly.

In addition, in the first to seventh embodiments, the mode has been illustrated in which the depth of the first dynamic pressure generating grooves and the second dynamic pressure generating grooves is constant, however, bottom surfaces may be inclined or formed in a stepped shape such that the first dynamic pressure generating grooves and the second dynamic pressure generating grooves become shallower toward the closed end portions.

Figure 15:
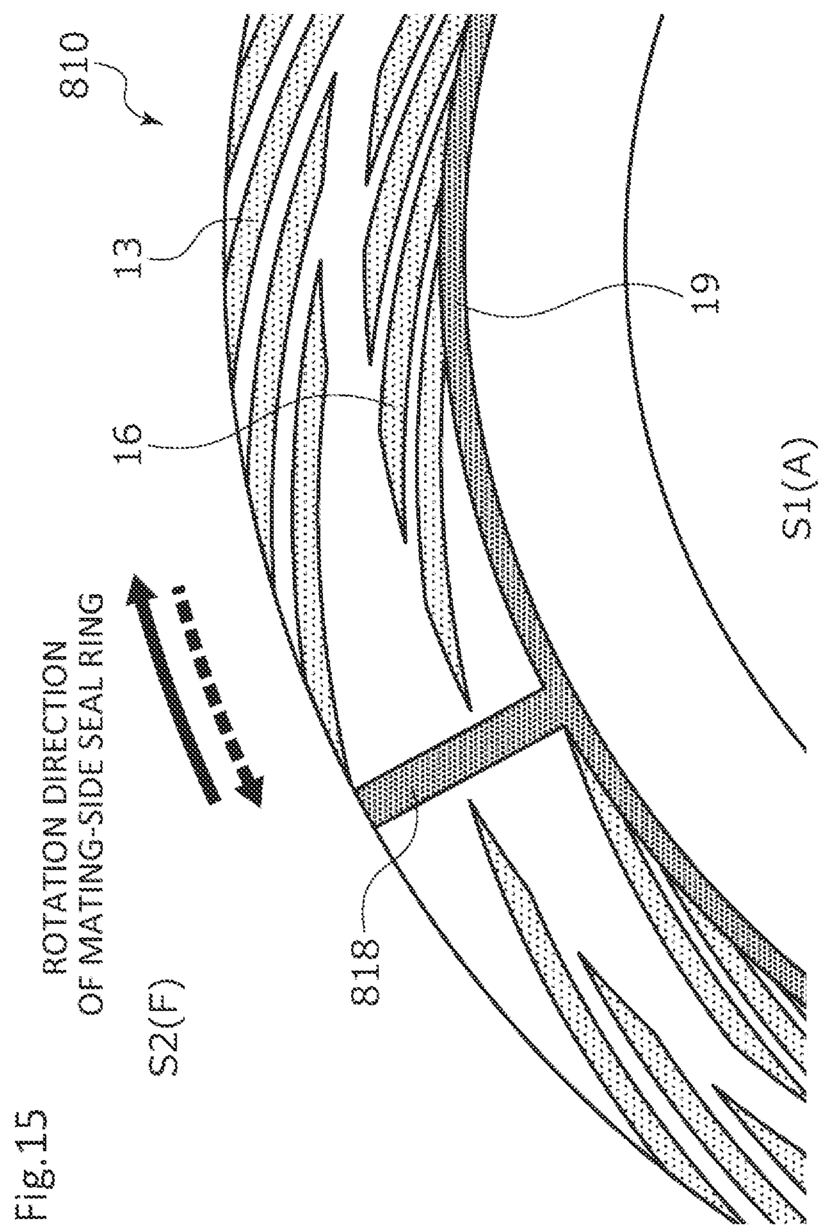
FIG. 15 is an enlarged view of a sliding surface of a stationary seal ring in a first modification example of the first embodiment when viewed in the axial direction.

In addition, in the first to seventh embodiments, the mode has been illustrated in which the communication grooves forming the conduit groove extend in the radial direction while inclining in the circumferential direction, however, as in a stationary seal ring 810 according to the first modification example of the first embodiment illustrated in FIG. 15, communication grooves 818 may extend linearly in the radial direction, and may communicate between the annular groove 19 and the outer space S2.

Figure 16:
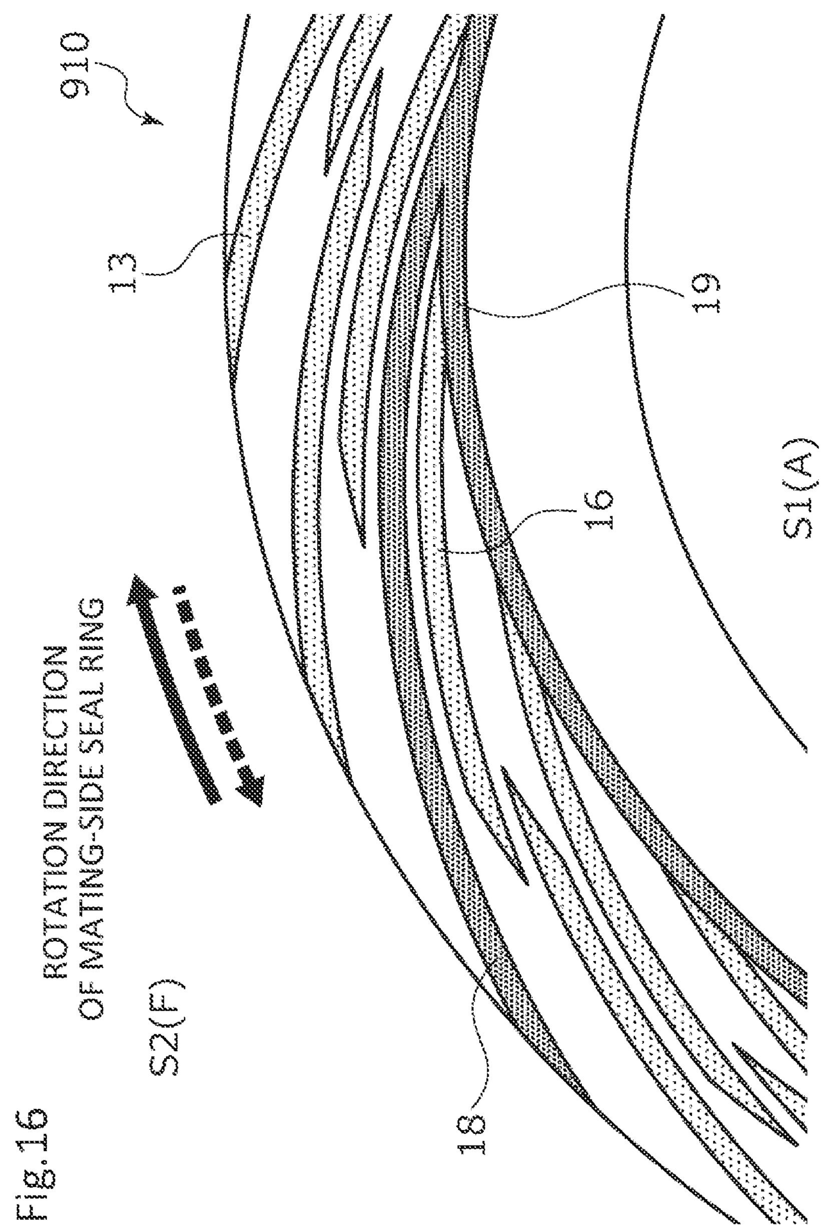
FIG. 16 is an enlarged view of a sliding surface of a stationary seal ring in a second modification example of the first embodiment when viewed in the axial direction.

In addition, in the first to seventh embodiments, the mode has been illustrated in which the land extending in the circumferential direction is provided between the first dynamic pressure generating grooves and the second dynamic pressure generating grooves, and the closed end portions face each other in the radial direction, however, as in a stationary seal ring 910 according to the second modification example illustrated in FIG. 16, the first dynamic pressure generating grooves 13 and the second dynamic pressure generating grooves 16 may be alternately disposed in the circumferential direction. In addition, the closed end portions of the first dynamic pressure generating grooves 13 may be disposed closer to an annular groove 19 side than the closed end portions of the second dynamic pressure generating grooves 16.

Figure 17:
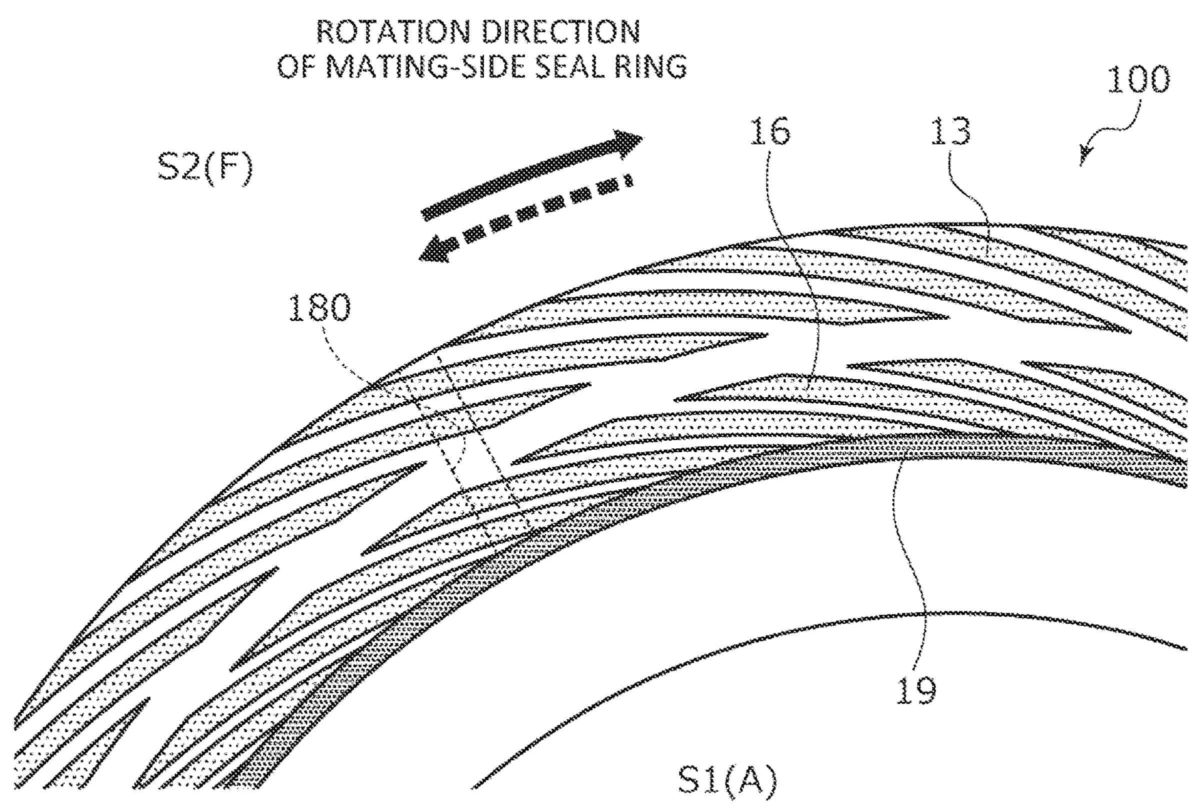
FIG. 17 is an enlarged view of a sliding surface of a stationary seal ring in a third modification example of the first embodiment when viewed in the axial direction.

In addition, in the first to seventh embodiments, the mode has been illustrated in which the communication grooves are formed in the sliding surface, however, as in a stationary seal ring 100 according to the third modification example illustrated in FIG. 17, a configuration may be adopted in which communication grooves 180 extend in the radially inward direction from an outer peripheral surface of the stationary seal ring 100, and radially inner end portions of the communication grooves 180 extend in the axial direction to communicate with the annular groove 19. In this case, the sealed fluid F does not flow in and out of the sliding surface from the communication grooves 180, and the first dynamic pressure generating grooves 13 and the second dynamic pressure generating grooves 16 are uniformly disposed in the circumferential direction. For this reason, a dynamic pressure is uniformly generated in the circumferential direction.

In addition, in the first to seventh embodiments, the mode has been illustrated in which the plurality of first dynamic pressure generating grooves and second dynamic pressure generating grooves having the same shape are provided in the circumferential direction in the stationary seal ring, however, the present invention is not limited thereto, and for example, the spiral grooves as in the first embodiment and the Rayleigh steps as in the third embodiment may be mixed in the stationary seal ring.

REFERENCE SIGNS LIST

1 Rotating shaft
2 Sleeve
4 Housing
10 Stationary seal ring
11 Sliding surface
12A Land
13 First dynamic pressure generating groove (spiral groove)
13A End portion (closed end portion)
13B End portion
16 Second dynamic pressure generating groove (spiral groove)
16B End portion (closed end portion)
17 Conduit groove
18 Communication groove
19 Annular groove
20 Rotating seal ring
21 Sliding surface
313B First Rayleigh step (first dynamic pressure generating groove)
316B Second Rayleigh step (second dynamic pressure generating groove)
530 Third dynamic pressure generating groove
A Atmosphere
C Cavitation region
F Sealed fluid
S1 Inner space (a second space)
S2 Outer space (a first space)

The invention claimed is:

1. Sliding components, comprising:

a pair of sliding surfaces disposed to face each other at a location where a relative rotation takes place when a rotating machine is driven, the sliding surfaces comprising a first sliding surface and a second sliding surface, a radially inner-side space and a radially outer-side space of the sliding surfaces comprising a first space and a second space, wherein the first sliding surfaces is provided with a first dynamic pressure generating groove communicating with the first space and extending from a side of the first space toward a first circumferential direction, a second dynamic pressure generating groove extending from a side of the second space toward a second circumferential direction opposed to the first circumferential direction, and a conduit groove communicating with the first space, the conduit groove has a circumferential groove and a communication groove communicating between the circumferential groove and the first space, and the second dynamic pressure generating groove is disposed closer to the first space than the circumferential groove, and directly communicates with the circumferential groove.

2. The sliding components according to claim 1, wherein a land extending in a circumferential direction is provided between the first dynamic pressure generating groove and the second dynamic pressure generating groove.

3. The sliding components according to claim 2, wherein a closed end portion of the first dynamic pressure generating groove and a closed end portion of the second dynamic pressure generating groove face each other in a radial direction.

4. The sliding components according to claim 1, wherein the conduit groove includes an annular groove as the circumferential groove.

5. The sliding components according to claim 1, wherein the first dynamic pressure generating groove and the second dynamic pressure generating groove are spiral grooves.

6. The sliding components according to claim 5, wherein the communication groove extends not to intersect the first dynamic pressure generating groove and the second dynamic pressure generating groove.

7. The sliding components according to claim 1, wherein a third dynamic pressure generating groove is provided in the first sliding surface so as to be closer to a side of the second space than the conduit groove.

8. The sliding components according to claim 7, wherein the third dynamic pressure generating groove is a bent groove communicating with the conduit groove.

9. The sliding components according to claim 2, wherein a third dynamic pressure generating groove is provided in the first sliding surface so as to be closer to a side of the second space than the conduit groove.

10. The sliding components according to claim 9, wherein the third dynamic pressure generating groove is a bent groove communicating with the conduit groove.

11. The sliding components according to claim 3, wherein a third dynamic pressure generating groove is provided in the first sliding surface so as to be closer to a side of the second space than the conduit groove.

12. The sliding components according to claim 11, wherein the third dynamic pressure generating groove is a bent groove communicating with the conduit groove.

13. The sliding components according to claim 4, wherein a third dynamic pressure generating groove is provided in the first sliding surface so as to be closer to a side of the second space than the conduit groove.

14. The sliding components according to claim 13, wherein the third dynamic pressure generating groove is a bent groove communicating with the conduit groove.

15. The sliding components according to claim 5, wherein a third dynamic pressure generating groove is provided in the first sliding surface so as to be closer to a side of the second space than the conduit groove.

16. The sliding components according to claim 15, wherein the third dynamic pressure generating groove is a bent groove communicating with the conduit groove.

17. The sliding components according to claim 6, wherein a third dynamic pressure generating groove is provided in the first sliding surface so as to be closer to a side of the second space than the conduit groove.

18. The sliding components according to claim 17, wherein the third dynamic pressure generating groove is a bent groove communicating with the conduit groove.

* * * * *